United States Patent
Bordawekar et al.

(10) Patent No.: US 10,831,738 B2
(45) Date of Patent: *Nov. 10, 2020

(54) PARALLELIZED IN-PLACE RADIX SORTING

(71) Applicant: International Business Machines Corporation, Armonk, NY (US)

(72) Inventors: Rajesh Bordawekar, Yorktown Heights, NY (US); Daniel Brand, Millwood, NY (US); Minsik Cho, Austin, TX (US); Ulrich Finkler, Mahopac, NY (US); Ruchir Puri, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 274 days.

This patent is subject to a terminal disclaimer.

(21) Appl. No.: 15/852,045

(22) Filed: Dec. 22, 2017

(65) Prior Publication Data

US 2018/0121481 A1 May 3, 2018

Related U.S. Application Data

(63) Continuation of application No. 14/750,363, filed on Jun. 25, 2015, now Pat. No. 9,892,149, which is a
(Continued)

(51) Int. Cl.
*G06F 16/23* (2019.01)
*G06F 16/28* (2019.01)
(Continued)

(52) U.S. Cl.
CPC .......... *G06F 16/23* (2019.01); *G06F 16/2237* (2019.01); *G06F 16/24532* (2019.01); *G06F 16/285* (2019.01)

(58) Field of Classification Search
CPC ..... Y10S 707/99933; Y10S 707/99942; Y10S 707/99943; Y10S 707/99932;
(Continued)

(56) References Cited

U.S. PATENT DOCUMENTS

| 8,094,157 B1 * | 1/2012 | Le Grand | G06F 7/24 345/501 |
| 2003/0067461 A1 * | 4/2003 | Fletcher | G06T 17/20 345/420 |

(Continued)

OTHER PUBLICATIONS

Agarwal, R., "A Super Scalar Sort Algorithm for RISC Processors" In Proceedings of ACM SIGMOD Int. Conf. on Management of Data, Jun. 1996, pp. 240-246.
(Continued)

*Primary Examiner* — Shyue Jiunn Hwa
(74) *Attorney, Agent, or Firm* — Fleit Intellectual Property Law; Jeffrey N. Giunta

(57) ABSTRACT

Apparatuses and Methods for sorting a data set. A data storage is divided into a plurality of buckets that is each associated with a respective key value. A plurality of stripes is identified in each bucket. A plurality of data stripe sets is defined that has one stripe within each respective bucket. A first and a second in-place partial bucket radix sort are performed on data items contained within the first and second data stripe sets, respectively, using an initial radix. Incorrectly sorted data items in the first bucket are grouped by a first processor and incorrectly sorted data items in the second bucket are grouped by a second processor into a respective incorrect data item group within each bucket. A radix sort is then performed using the initial radix on the items within the respective incorrect data item group. A first level sorted output is produced.

20 Claims, 12 Drawing Sheets

Related U.S. Application Data continuation of application No. 14/582,337, filed on Dec. 24, 2014, now Pat. No. 9,824,111.

(60) Provisional application No. 61/932,989, filed on Jan. 29, 2014.

(51) Int. Cl.
G06F 16/22 (2019.01)
G06F 16/2453 (2019.01)

(58) Field of Classification Search
CPC ............. Y10S 707/99937; B33Y 50/00; G06F 16/2246; G06F 16/24532; G06F 17/30327; G06F 17/5036; G06F 7/24; G06F 16/285; G06F 16/2237; G06F 16/23; G06F 16/2228; G06F 16/2282; G06T 17/20
See application file for complete search history.

(56) References Cited

U.S. PATENT DOCUMENTS

2003/0130981 A1\* 7/2003 Nehru ................. G06F 16/2246
2003/0158842 A1\* 8/2003 Levy ................ G06F 16/24532

OTHER PUBLICATIONS

Albutiu, M., et al., "Massively Parallel Sort-Merge Joins in Main Memory Multi-Core Database Systems," Proc. VLDB Endow, Aug. 2012, pp. 1064-1075.
Dachsel, H., et al., "Library Support for Parallel Sorting in Scientific Computations." Euro-Par Parallel Processing, Aug. 2007, 695-704.
Dusseau, A., et al., "Fast Parallel Sorting Under LogP: Experience with the CM-5." IEEE Transactions on Parallel and Distributed Systems, Jun. 1996, 1-27.
Gedik, B., et al., "CellSort: High Performance Sorting on the Cell Processor." In Proceedings of VLDB Endow, Sep. 2007, pp. 1286-1297.
Govindaraju, N., et al., "GPUTeraSort: High Performance Graphics Co-processor Sorting for Large Database Management." In Proc. ACM SIGMOD Int. Conf. on Management of Data, Jun. 27-29, 2006, pp. 1-12.
Guo, Q., et al., "AC-DIMM: Associative Computing with STT-MRAM." In Proc. Int. Symp. on Computer Architecture, Jan. 2013, pp. 1-12.
Zhang, K., et al., "A Novel Parallel Approach of Radix Sort with Bucket Partition Preprocess." In Proc. IEEE Conf. on Embedded Software and Systems, Jun. 2012, pp. 989-994.
Wikipedia, "Radix Sort," Edited online on Dec. 2014, Last visited on Mar. 31, 2015, pp. 1-19.
Inoue, J., et al., "AA-Sort: A New Parallel Sorting Algorithm for Multi-Core SIMD Processors." In Proc. Int. Cont on Parallel Architectures and Compilation Techniques, Sep. 2007, pp. 1-10.
Jimenez-Gonzalez., D., et al., "Fast Parallel In-Memory 64-bit Sorting." In Proc. Int. Conf. on Supercomputing, Jun. 2001, pp. 114-122.
Kim, C., et al., "Sort vs. Hash Revisited: Fast Join Implementation on Modern Multi-Core CPUs." Proc. VLDB Endow, Aug. 2009, 1-12.
Kim, C., et al., "CloudRAMSort: Fast and Efficient Large-Scale Distributed RAM Sort on Shared-Nothing Cluster." In Proc. ACM Sigmod Int. Conf. on Management of Data, May 20-24, 2012, pp. 1-10.
Lee, S., et al., "Partitioned Parallel Radix Sort." J. Parallel Distrib. Comput., Apr. 2002, pp. 1-12.
McIlroy, P., et aL., "Engineering Radix Sort." Computing Systems, Oct. 1992, pp. 1-22, vol. 6, No. 1.
Merrill, D., et al., "High Performance and Scalable Radix Sorting: A Case Study of Implementing Dynamic Parallelism for GPU Computing." Parallel Processing Letters, Mar. 2011, pp. 1-28.
Ousterhout., J., et al., "The Case for RAMClouds: Scalable High-Performance Storage Entirely in DRAM." SIGOPS Oper. Syst. Rev, Dec. 2009, pp. 92-105, vol. 43, No. 4.
Pasetto, D., et al., "A Comparative Study of Parallel Sort Algorithms." In Proc. ACM Int. Conf. on Object Oriented Programming Systems Languages and Applications, Oct. 2011, pp. 1-18.
Ranganathan, P., "From Microprocessors to Nanostores: Rethinking Data-Centric Systems" IEEE Computer Society, Jan. 2011, pp. 39-48.
Satish, N., et al., "Fast Sort on CPUs and GPUs: A Case for Bandwidth Oblivious SIMD Sort." In Proc. ACM SIGMOD Int. Conf. on Management of Data, Jun. 2010, pp. 351-362.
Satish, N., et al., "Fast Sort on CPUs, GPUs and Intel MIC Architectures." Technical report, Intel Labs, Jun. 2010, pp. 1-11.
Singler, J., et al., "The GNU Libstdc++ Parallel Mode: Software Engineering Considerations." In Proc. of Int. Workshop on Multicore Software Engineering, May 11, 2008, pp. 1-8.
Singler, J., et al., "MCSTL: The Multi-Core Standard Template Library." In Proc. Int. Euro-Par Conf. on Parallel Processing, Aug. 2007, pp. 1-12.
Sohn, A., et al., "Load Balanced Parallel Radix Sort." In Proc. Int. Conf. on Supercomputing, Jul. 14-17, 1998, pp. 1-8.
Wassenberg, J, et al., "Engineering a Multi-core Radix Sort." In Proc. Int. Conf. on Parallel Processing. Aug.-Sep. 2011, pp. 160-169.
Zagha, M., et al., "Radix Sort for Vector Multiprocessors." In Proc. Int. Conf. on Supercomputing, Nov. 1991, pp. 1-10.
Edahiro, M., "Parallelizing Fundamental Algorithms such as Sorting on Multi-core Processors for EDA Acceleration." Jan. 2009, pp. 1-46.
Wassenberg, J., et al., "Faster Radix via Virtual Memory and Write-Combining." Sep. 7, 2010, pp. 1-6.
Ebert, A., "NTOSort," Apr. 2013, pp. 1-6.
Singler, J., et al., "The GNU libstdc++ parallel mode: Algorithms." No date provided, pp. 1-40.
Haglin, D., et al., "Scalable, Multithreaded, Partially-in-place Sorting." May 2013, pp. 1-9.
Bertasi, P., et al., "psort 2011—pennysort, datamation, joulesort." Jan. 2011, pp. 1-10.
Rashid, L., et al., "Analyzing and Enhancing the Parallel Sort Operation on Multithreaded Architectures," The Journal of Supercomputing, Aug. 2010, pp. 1-12, vol. 53, Issue 2.

\* cited by examiner

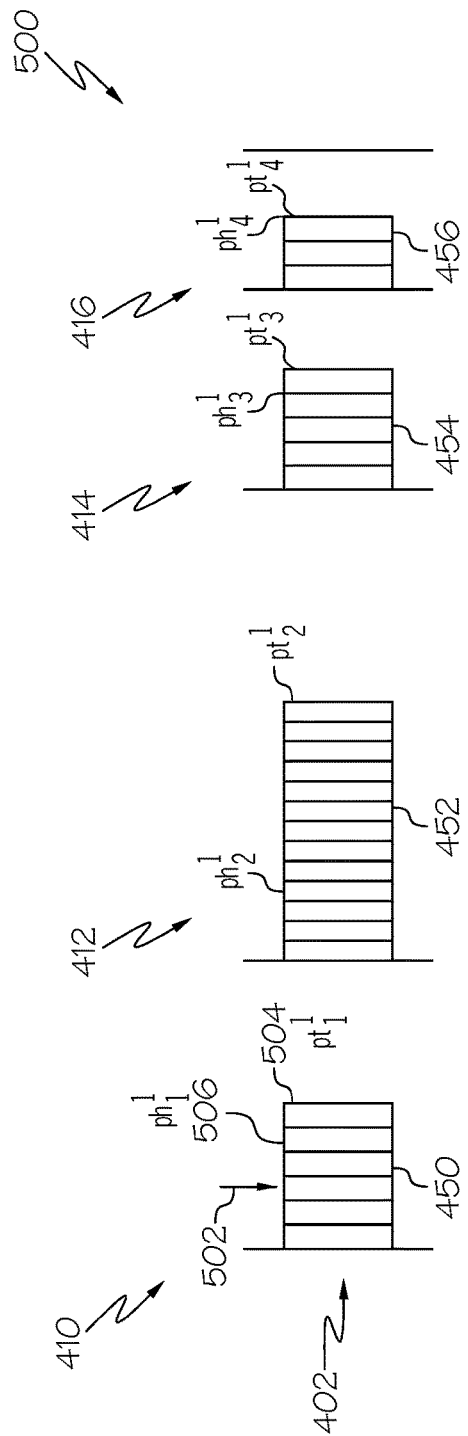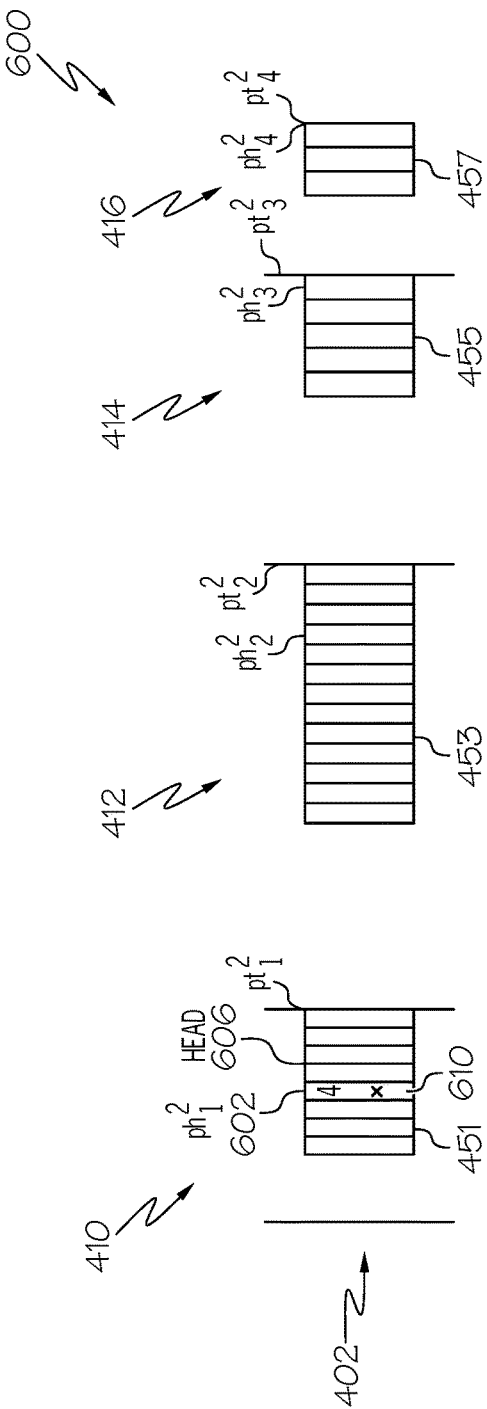

PARALLELIZED IN-PLACE RADIX SORTING

BACKGROUND

The present disclosure generally relates to the field of sorting sets of data, and more particularly to the field of a performing parallelized processing to implement a radix sort of said data.

In-place radix sorting is a useful sorting algorithm for sorting large data sets with numeric or string keys. In-place Radix sorting has a linear run-time and constant memory complexity. Benefits of in-place radix soring include efficiently operating within a large memory footprint by delivering high performance with fewer cache misses and page faults than approaches requiring extra memory.

BRIEF SUMMARY

In one example, a method for sorting data items divides a data storage into a plurality of buckets having at least a first bucket and a second bucket that is each associated with a respective key value. A respective plurality of stripes is identified in each bucket. A plurality of data stripe sets is defined that has at least a first data stripe set and a second data stripe set that is different from the first data stripe set, where each data stripe set comprises a respective stripe within each respective bucket of the plurality of buckets. A first in-place partial bucket radix sort is performed using an initial radix value on data items contained within the first data stripe set. A second in-place partial bucket radix sort is performed using the initial radix value on data items contained within the second data stripe set. Incorrectly sorted data items are then grouped in each bucket into a respective incorrect data item group within each bucket. The grouping includes grouping incorrectly sorted data items in the first bucket with the first processor and grouping incorrectly sorted data items in the second bucket with a second processor that is different from the first processor while grouping incorrectly sorted data items in the first bucket with the first processor. A radix sort is then performed using the initial radix on the items within the respective incorrect data item group. A first level sorted output is produced In another example, a device for data set sorting apparatus includes a multiple processor computing apparatus and a memory coupled to the computing apparatus. The device further includes a data sorting processor, coupled to the computing apparatus and the memory, the data sorting processor is configured to divide a data storage into a plurality of buckets that is each associated with a respective key value. The data sorting processor is also configured to identify a plurality of stripes in each bucket. The data sorting processor is also configured to define a plurality of data stripe sets that has one stripe within each respective bucket. The data sorting processor is also configured to perform a first in-place partial bucket radix sort on data items contained within the first data stripe set and a second in-place partial bucket radix sort on data items contained within the second data stripe set using an initial radix. The data sorting processor is also configured to group incorrectly sorted data items in each bucket into a respective incorrect data item group within each bucket where, the incorrectly sorted data items comprising data items within the first bucket but having a respective radix value associated with a different bucket. The data sorting processor is configured to group by at least grouping incorrectly sorted data items in the first bucket with the first processor and grouping incorrectly sorted data items in the second bucket with a second processor that is different from the first processor while grouping incorrectly sorted data items in the first bucket with the first processor. The data sorting processor is also configured to perform a radix sort using the initial radix on the items within the respective incorrect data item group. A first level sorted output is produced.

In yet another example, a computer program product for sorting a data set includes a storage medium readable by a processing circuit and storing instructions for execution by the processing circuit for performing a method including dividing a data storage into a plurality of buckets that is each associated with a respective key value. The method also includes identifying a plurality of stripes is identified in each bucket and defining a plurality of data stripe sets that has at least a first data stripe set and a second data stripe set that is different from the first data stripe set, where each data stripe set comprises a respective stripe within each respective bucket of the plurality of buckets. The method further includes performing a first in-place partial bucket radix sort using an initial radix value on data items contained within the first data stripe set and second in-place partial bucket radix sort using the initial radix value on data items contained within the second data stripe set. The method groups incorrectly sorted data items in each bucket into a respective incorrect data item group within each bucket by grouping incorrectly sorted data items in the first bucket with the first processor and grouping incorrectly sorted data items in the second bucket with a second processor that is different from the first processor while grouping incorrectly sorted data items in the first bucket with the first processor. The method performs a radix sort using the initial radix on the items within the respective incorrect data item group. A first level sorted output is produced.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various examples and to explain various principles and advantages all in accordance with the present disclosure, in which:

FIG. 5 illustrates a first data stripe set, according to one example;

FIG. 6 illustrates a second data stripe set, according to an example;

DETAILED DESCRIPTION

Figure 1:
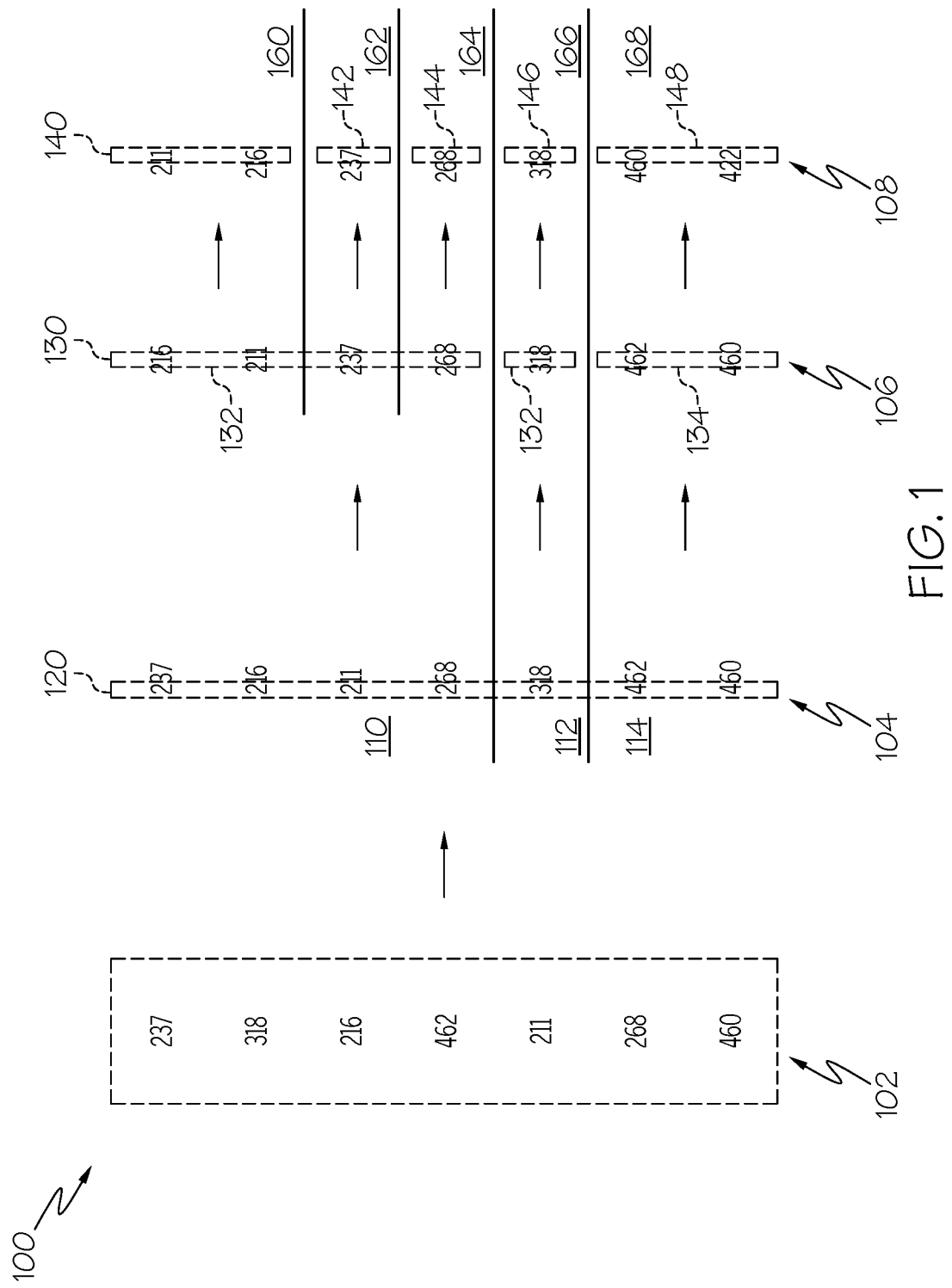
FIG. 1 illustrates an example radix sorting process, in accordance with one example.

In-place radix sorting is a useful sorting algorithm for sorting large data sets with numeric or string keys. In-place Radix sorting has a linear run-time and constant memory complexity. Efficient parallelization of in-place radix sorting has several challenges. Permuting elements into buckets during the initial phase of sorting on the first key value is constrained by the read-write dependency inherent in the in-place sorting process. Further, load-balancing when recursively sorting on lower levels keys of the data set in the resulting buckets is complicated by the various sizes of the buckets, which occurs with skewed distributions of the data set being sorted.

The below described system and methods describe a highly scalable and efficient parallelized radix sorting process that allows multiple processors to each efficiently process portions of a large data set to perform a radix sort upon the whole data set. In one example, systems include a multiple processor computing apparatus that has multiple processors to implement the parallel sorting processing described below. The below described system and methods implement efficient parallel processing based on algorithmic improvements that are independent of any specific hardware-dependent constructs such as combined write-back, single instruction, multiple data (SIMD), and the like. The following examples perform speculative permutation of data elements according to keys followed by a repair process that are both efficiently parallelized. Iteration of these two steps performs permutation of all elements to in the data set into their buckets through a fully in parallel and in-place process. This algorithm is able to be recursively invoked on the resulting buckets that are sorted according to a particular key in a manner that allows efficient parallelization by the use of distribution-adaptive load-balancing across the multiple processors. For a skewed data distribution, these examples minimize run-time by adaptively allocating more processors to larger buckets. The below algorithms allow improved efficiencies on various processing platforms, and the performance of these algorithms is further amenable to improvements through the use of hardware-specific accelerations, such as SIMD processors.

In some examples, implementing parallel processing for radix sorting on a data set is facilitated by partitioning, or dividing, the data set into stripes that are processed by different processors in a share-nothing fashion so as to avoid read-after-write dependencies. The size of these stripes is not strictly determined based on the number of data items that are anticipated to be placed into those stripes after sorting is complete, but rather the size of the stripes is determined on a speculative basis. Since the size of these stripes may not equal the number of data items that are required to be placed into those stripes when sorting is complete, there will be some data items that are not sorted after performing permutation of the data items in those stripes according to a radix sort. In order to accommodate the data items that are not properly sorted, some examples perform a repair process to correctly place the data items that are not properly sorted by the permutation sorting process operating in parallel independently on the separate stripes. The two stages of this process, i.e., data item permutation and subsequent repair of unsorted items in each bucket, are iterated in one example until a complete redistribution of all the data items in the data set into their proper buckets is achieved. The design of the speculative partitioning is such that both stages can be executed in parallel, where all processors have an approximately equal load, achieving good scalability. In some example, any extra processing resources taken by the repair process to accommodate the speculative permutation of a portion of each bucket allows increasing scalability.

Details of some aspects of the below described systems and methods are described in U.S. Provisional Patent Application No. 61/932,989, filed Jan. 29, 2014, the entire contents of which is hereby included herein by reference.

FIG. 1 illustrates an example radix sorting process 100, in accordance with one example. The radix sorting process begins with an unsorted data set 102 that is illustrated as a set of seven (7) three digit numbers. In general, an unsorted data set processed by a radix sort algorithm is able to include any number of data items and is in general able to be quite large. In order to more clearly describe certain aspects of this process, a simple example using three digit numbers is illustrated. In general, as is understood by practitioners of ordinary skill in the relevant arts, any type of data is able to be sorted by a radix sort.

In the following discussion, the portion of each data item used as the basis to sort the data set is referred to as the present key. As is generally understood and illustrated in this example, a radix sort is able to iteratively sort data items by progressively ordering the data items according to "keys" or portions of the data. In the illustrated example radix sorting process as is described below, each the data items are iteratively sorted by progressively selecting each digit of the three digit numbers as the present key.

The illustrated example radix sort process 100 first sorts the unsorted data set 102 according to the most significant digit 120 of each data item in the set. The first sorted data set 104 illustrates the data sorted according to only the most significant digit 120 where data items in the 200's precede those in the 300's and the data items in the 400's are last. An example of processing to implement such a radix sort is described in further detail below. In performing a radix sort, the data to be sorted is able to be thought of as being divided into groups where each group contains data having the same current key value. In the following discussion, these groups are referred to as "buckets." In the illustrated example, the data items in the first sorted data set 104 are grouped according to the value of the data items' most significant digit, which is the first key in this example. As illustrated, data items starting with "2" are grouped into a first bucket 110, data items starting with "3" are grouped into a second bucket 112, and data items beginning with "4" are grouped into a third bucket 114. In general, when sorting decimal based numbers, a radix sort uses ten (10) buckets, one for each possible digit value. When sorting data according to other types of keys, such as sorting alphanumeric values, sorting data using keys of arbitrary number of possible values such as keys defined by a certain number of binary bits, or any other type of key, the number of buckets generally equals the number of possible values that the key is able to have in the data set. In the illustrated example radix sort 100, only three of these ten buckets are depicted in order to simplify the description and focus on the relevant concepts.

Although the first sorted data set 104 is sorted according to its most significant digit, the data items in each bucket are otherwise unsorted. The radix sort in this example performs another iteration to further sort the data in each bucket of the first sorted data set according to the next most significant digit, i.e., the second digit of each data item, to produce a second sorted data set 106. In this example, the second digit is the second key used for the radix sort. In the second sorted data set 106, the data in the first bucket 110 is sorted according to the first bucket second digit 130, the data in the second bucket 112 is sorted according to the second bucket second digit 132, and the data in the third bucket 114 is sorted according to the third bucket second digit 134.

Sorting the first sorted data set 104 is based on defining sub-buckets of each bucket defined for the key used to create the first sorted data set i.e., the first key or the most significant digit in this example. Because a radix sort places data into sub-buckets according to values of a second key after that data has been sorted by a first key, the data in the sub-buckets used for sorting on the second key contain data that have the same value for the first key as well as the same value for the second key.

The example radix sort process 100 illustrates a first sub-bucket of the first bucket 160, which contain data items having the same value of the second key, which is the second digit in this example. Because the data set has already been sorted according to the first key, which is the first digit, the data items in the first sub-bucket 160 have the same values of the first key and second key, i.e., 21x, where x is the value of the third digit. Similarly, the second sorted data set 106 has a second sub-bucket of the first bucket 162, and a third sub-bucket of the first bucket 164. Again, in general, there would be ten (10) sub-buckets for each bucket of the first key, but fewer are shown here for simplicity. The second bucket 112 and third bucket 114 are shown to only have one sub-bucket, the first sub-bucket of the second bucket 166 and the first sub-bucket of the third bucket 168, due to the small size of the data set. In general, these buckets used to sort according to the first key would also each have their own ten (10) buckets to reflect the number of possible values of the second key.

Even though the illustrated example illustrates a relatively small data set for simplicity of explanation, each bucket and sub-bucket is in general able to contain many data items. For example, the second bucket 112 of the illustrated example only contains one data item and thus sorting is not really performed in that case. The third bucket 114 contains two data items with the same second digit 134, thus sorting is trivial. Although unlikely, buckets or sub-buckets containing such small amounts of data or data with similar values are able to occur in practice and do not affect the generality of the present discussion.

To complete the sort of the illustrated data set, a third iteration of a radix sort is performed to further sort the second sorted data set 106 according to the next most significant digit, which is the third digit in this example, to create a third sorted data set 108. In this example, each sub-bucket of the second sorted data set 106 is further divided into its own sub-buckets in an iterative fashion according to the above described process. Due to the small size of the illustrated data set, only a few sub-buckets are illustrated. It is to be understood that, in general, performing a radix sort at a given iteration level uses a number of buckets corresponding to the number of possible values for that key in the data.

The third sorted data set 108 depicts data in the first sub-bucket of the first bucket 160 sorted according to the third key, i.e., the third significant digit of the data item. The first sub-bucket of the third bucket 168 has two data items that are sorted according to the third key. The other illustrated sub buckets, i.e., the second sub-bucket of the first bucket 162, the third sub-bucket of the first bucket 164, and the first sub-bucket of the second bucket 166, only have one data item and therefore do not require sorting. As shown, the third sorted data set 108 contains a numerically sorted list of the seven (7) numbers contained in the unsorted data set 102.

Figure 2:
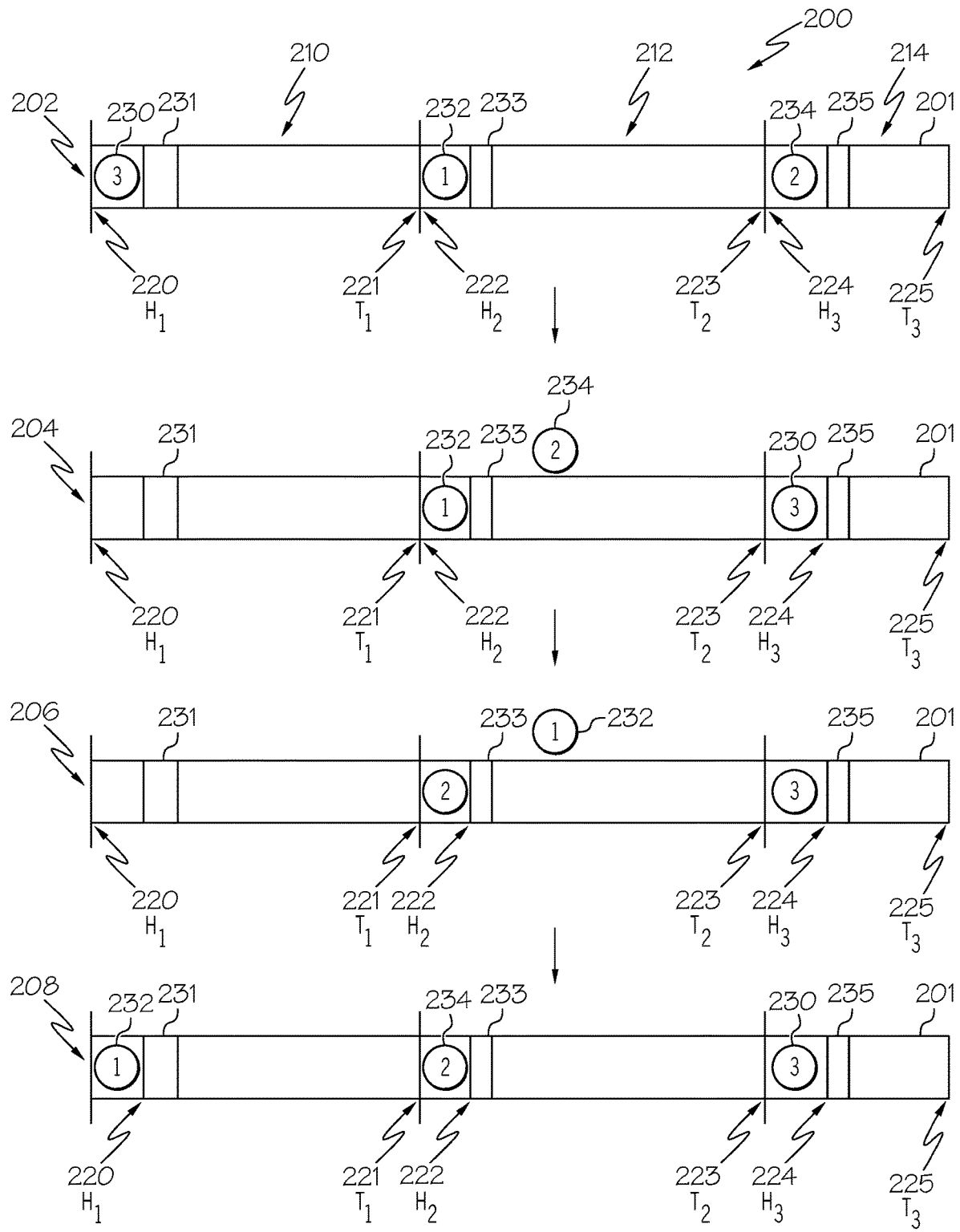
FIG. 2 illustrates an example in-place radix sort process, according to an example.

FIG. 2 illustrates an example in-place radix sort process 200, according to an example. The example in-place radix sort process 200 is a data sorting process that allows a large data set to be sorted by swapping data items in the memory storing the data set, and therefore only requires memory to store the original data set and does not use intermediate buffers to store large amounts of the data set during sorting. The illustrated example in-place radix sort is used to describe a technique to perform a radix sort on a data set using a particular key, such as a digit in a given position within a number, or an alphanumeric value in a given position in a textual data set. The following description, numeric data is presented where the key has three possible 1, 2, or 3. Such a limited range of values is used to simplify the description and is not intended to limit the generality of the description, which is applicable to any data set that can be sorted using keys of any range of values.

The example in-place radix sort process 200 depicts an initial data set 202 that is stored in a data structure 201. The depicted data structure 201 is able to represent any accessible data storage device such as a data vector in a computer memory, data stored on a mass storage device, data stored in any suitable device, or combinations of these. The initial data set 202 is divided into three buckets, a first bucket 210, a second bucket 212, and a third bucket 214. In a manner similar to that discussed above with regards to the example radix sort 100, the example in-place radix sort process 200 presents a simplified illustration of data to more clearly describe relevant concepts and is not a limiting example of performing an in-place radix sort.

The three illustrated buckets are similar to the buckets described above for the example radix sort 100. In this example, the first bucket 210 stores data with a first key value equal to one (1), the second bucket 212 stores data with a first key value equal to two (2), the third bucket 214 stores data with a first key value equal to one (3). A technique to define the division of the initial data set 202 into these buckets is described below. In general, the goal of a first level radix sort is to sort the initial data set 202 such that all of the data items in the first bucket 210 have a first key value equal to one (1), all of the data items in the second bucket 212 have a first key value equal to two (2), all of the data items in the third bucket 214 have a first key value equal to three (3).

The initial data set 202 in one example is stored as a data vector or similar data structure that contains a number of storage locations where each storage location stores one data item. The initial data set 202 is divided into the three buckets, as discussed above. Initially, all data items of the initial data set 202 are to be processed by the radix sorting process for the first key value. As the radix sort processes the stored data items, more data items are identified to be or are moved to be properly located in the correct bucket, which means that these data items are known to have key values corresponding to the key value associated with that bucket. The data remaining in each bucket that is to be processed by the sorting process is identified by data pointers pointing to certain data items in the data structure 201. At the start of processing, as indicted with the initial data set 202, all data is to be processed by the sorting process. In this example, the start of data to be processed in the first bucket is defined by a first head pointer $H_1$ 220, which points to the first data item in the first bucket 210 within the data structure 201, and a first tail pointer T₂ 221, which points to the last data item in the first bucket 210 within the data structure 201. Similarly, the start of data to be processed in the second bucket is indicated by a second head pointer $H_2$ 222, which points to the first data item in the second bucket 212, and a second tail pointer $T_2$ 223, which points to the last data item in the second bucket 212. The start of data to be processed in the third bucket is indicated by a third head pointer $H_3$ 224, which points to the first data item in the third bucket 214, and a third tail pointer $T_2$ 223 points to the last data item in the third bucket 214. As a radix sort progresses, these pointers are generally changed to move towards one another as more data is determined to be located in its proper bucket.

At the head of the first bucket 210 is a first data item 230, pointed to the by first head pointer $H_1$ 220, and is followed by a first bucket second data item 231 within the data structure 201. The key value of the first data item 230 is three (3), as is indicated by the numeral in that data item's depiction. A second data item 232, with a key value of one (1) as indicated by the numeral in its depiction, is at the head of the second bucket 212 and is pointed to by the second head pointer $H_2$ 222. A third data item 234 with a key value of two (2) as indicted by the numeral in its depiction is at the head of the third bucket 214 and is pointed to by the third head pointer $H_3$ 224. The second data item 232 is followed in the data structure 201 by a second bucket second data item 233, and the third data item 234 is followed in the data structure 201 by a third bucket second data item 235.

At the start of the radix sort, the first data item to be processed in the first bucket 210 is indicated by the first head pointer $H_1$ 220. A sorting processor uses the first head pointer $H_1$ 220 to accesses the first data item 230 in this case and determines its key value, which is "3" in this case. The key value of "3" for the first data item 230 indicates that it is incorrectly located in the first bucket 210 and should be placed into the third bucket 214. The sorting processor uses the head pointer for the third bucket 214, i.e., the third head pointer $H_3$ 224, to access the first data item to be processed in the third bucket. In the example illustrated with the initial data set 202, the third head pointer $H_3$ points to the third data item 234, which has a key value of "2," thus indicating that it is incorrectly placed in the third bucket 214 and should be in the second bucket 212.

A first exchanged data set 204 illustrates the location of data after the first data item pointed to by the first head pointer $H_1$ 220 is placed into the first location of the third buffer 214. Because the third data item 234 is improperly located in the third bucket, the sorting processor withdraws the value of the third data item 234 from the location pointed to by the third head pointer and places the first data item 230 into that location. The third head pointer is then incremented to point to the third bucket second data location 235, indicating that the first data item located at the start of the third bucket is properly located.

The first exchanged data set 204 is then similarly processed to properly place the third data item 234 that was extracted from the data structure to place the first data item 230 into the third bucket 214. The third data item 234 has a key value of "2" and thus is to be placed into the second bucket 212. The sorting processor in this case examines the key value of the data item pointed to by the second head pointer H2 222, which is the second data item 232 in this case.

A second exchanged data set 206 is created by placing the third data item 234 into the second bucket 212. The sort processor examines the data item pointed to the by second head pointer 222, which is the second data item 232 in this case. This data item has a key value of "1," indicating that it is not in its proper location. The sort processor extracts the value of the second data item 232 prior to placing the first data item 230 into the location pointed to by the second head pointer $H_2$ 222, and then increments the value of the second head pointer $H_2$ 222 to point to the second bucket second data item 233. The second data item 232 has a key value of "1" and is placed at the location from which the first data item 230 was originally extracted, i.e., the location pointed to by the first head pointer $H_1$ 220. The final exchanged data set 208 in this example is then completed by incrementing the first head pointer $H_1$ 220 to point to the first bucket second data item 231.

In the above example, each head pointer pointed to a data item that was not located in its proper bucket. As is understood by practitioners of ordinary skill in the relevant arts in light of the present discussion, if a head pointer is pointing to a data item that is located in its proper bucket, i.e., the key value of that data item matches the key value associated with that bucket, the head pointer is simply incremented to the next data item in the data structure 201. The data items pointed to by the head pointer are then successively examined as the head pointer is incremented until a data item is pointed to with a key value that does not match the bucket in which it is stored.

In the above example, the head pointers are incremented as more data is processed until the head pointer for a particular bucket points to the same location as the tail pointer for that same bucket. When the head pointer and tail pointer point to the same location, the values of those pointers are said to be equal. A determination is able to be made that there is no more data to process in a particular bucket when the head pointer for that bucket equals the tail pointer.

Figure 3:
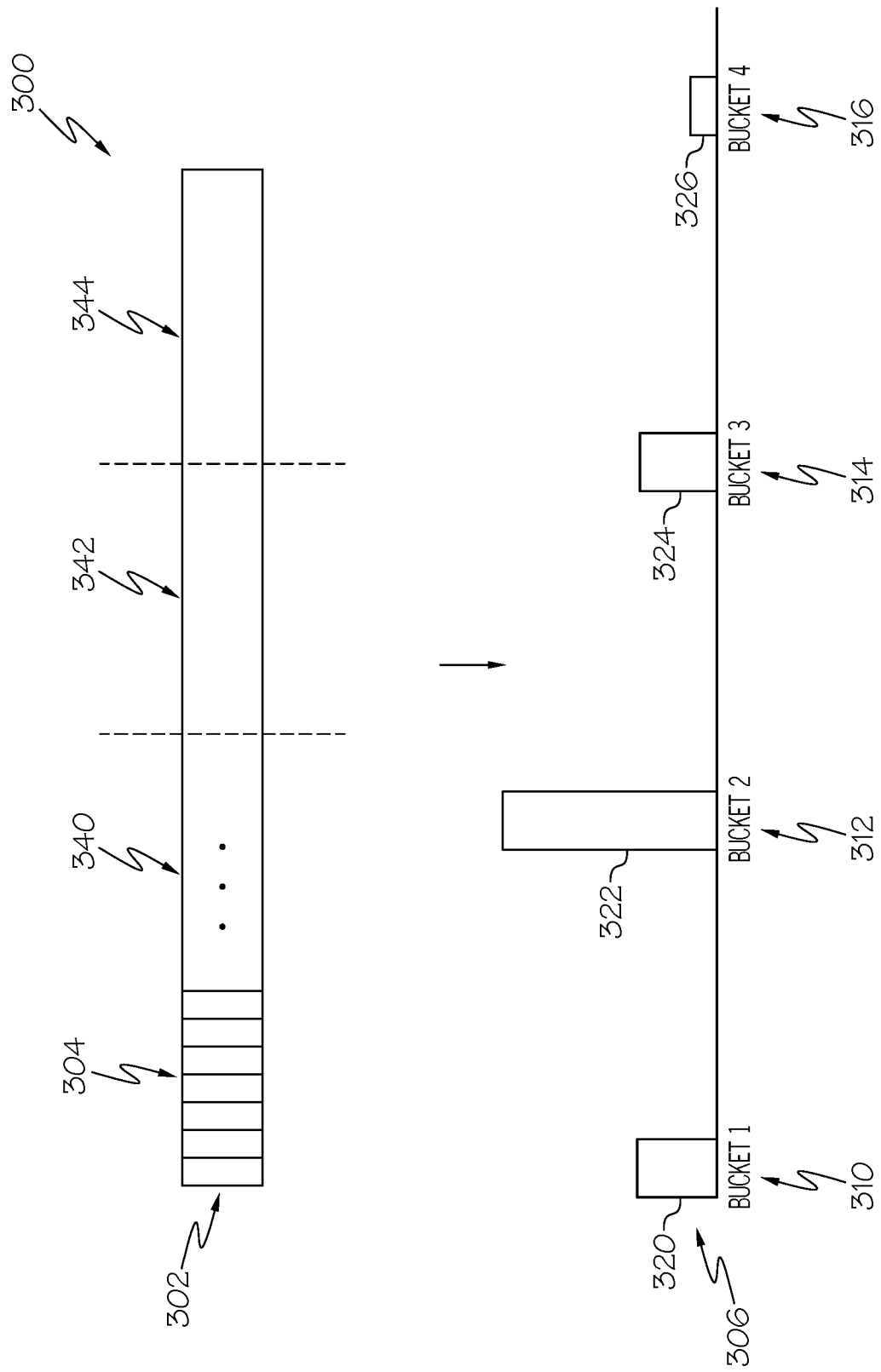
FIG. 3 illustrates an example histogram generation, according to an example.

FIG. 3 illustrates an example histogram generation 300, according to an example. The example histogram generation 300 illustrates a process used to determine the size of each bucket in a data set. The example histogram generation 300 processes a data structure 302 that contains a number of data items 304. The example histogram generation 300 in one example performs one pass over all data items 304 in the entire data structure 302 to simply count the number of occurrences of each key value in all of the data items 304.

The example histogram generation 300 creates a histogram 306 that includes a number of items that were counted having each respective key value. The example histogram generation 300 illustrates a case where there the key over which the data items 304 are to be sorted are able to have four possible values. Because the key is able to have one of four possible values, there are four buckets defined for the output sorted according to that key. The histogram 306 therefore contains four values that correspond to the number of data items that are to be stored in each bucket after the data set is sorted according to that key. A first bucket count 320 indicates the number of data items that have a key value of "1" and is therefore the number of data items to be placed in the first bucket 310, a second bucket count 322 indicates the number of data items that have a key value of "2" and is therefore the number of data items to be placed in the second bucket 312, a third bucket count 324 indicates the number of data items that have a key value of "3" and is therefore the number of data items to be placed in the third bucket 314, and a fourth bucket count 326 indicates the number of data items that have a key value of "4" and is therefore the number of data items to be placed in the fourth bucket 316. The values determined for the histogram 306 are used in one example to set head pointers and tail pointers into the data structure 302 to support radix sorting, such as is described above with regards to the example in-place radix sort 200.

In one example, the histogram for a data set is able to be performed by a number of processors operating in parallel. In one example, a data structure 302 is able to be evenly divided into a number of segments of equal size, with one segment being assigned to a separate processor to accumulate the histogram data for that segment. In the illustrated example histogram generation 300, the data structure 302 is divided into three segments, a first segment 340, a second segment 342, and a third segment 344. In this example, each of these three segments have an equal number of data items, which is one third of the number of data items in the data set stored in the data structure 302. A first processor is assigned to count occurrences of key values in the first segment 340, a second processor is assigned to count occurrences of key values in the second segment 342, and a third processor is assigned to count occurrences of key values in the third segment 344. Each of these processor counts these occurrences, and the histogram data counted by each processor for each key value are then added together to determine the total number of occurrences of each key value in the entire data structure 302 that is to be sorted.

Figure 4:
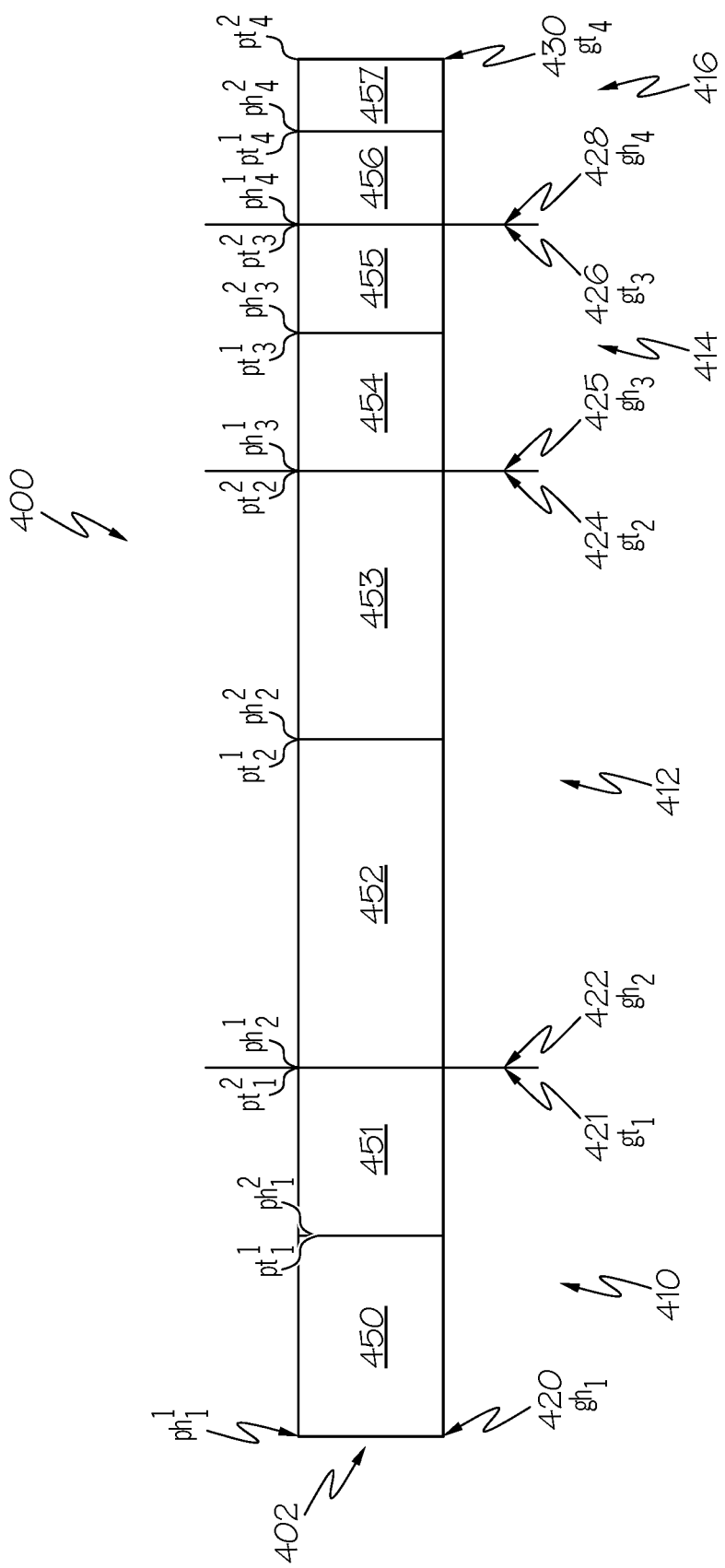
FIG. 4 illustrates a divided data set for parallel radix sorting, according to an example.

FIG. 4 illustrates a divided data set for parallel radix sorting 400, according to an example. The divided data set for parallel radix sorting 400 is an example of a data structure 402 that is divided into four (4) buckets to support radix sorting based on a key value having two data bits. The data structure 402 is divided into a first bucket 410, a second bucket 412, a third bucket 414, and a fourth bucket 416. This example illustrates four buckets and a two data bit key to simplify the discussion of relevant concepts in a clear and concise manner. It is clear that the principles discussed with regards to the illustrated example are able to be extended to sorting data using key values having range of values.

The storage location within the data structure 402 that define the dividing points between the four buckets is determined in one example by a histogram, such as is discussed above with regards to FIG. 3, of the data contained within the data structure 402. Such a histogram identifies the number of data items in each bucket, and thereby supports defining pointers to data elements that correspond to the dividing line between buckets, which will be the dividing line between data elements with different key values when sorting of the data in the data structure according to the present key value is completed.

The first bucket 410 is initially defined by the first global head pointer $gh_1$ 420 and the first global tail pointer $gt_1$ 421. The second bucket 412 is initially defined by the second global head pointer $gh_2$ 422 and the second global tail pointer $gt_2$ 423. The third bucket 414 is initially defined by the third global head pointer $gh_3$ 425 and the third global tail pointer $gt_3$ 426. The fourth bucket 416 is initially defined by the global head pointer $gh_4$ 428 and the second global tail pointer $gt_4$ 430.

In the illustrated divided data set for parallel radix sorting 400, each bucket is further divided into two stripes to support parallel radix sorting of the data structure 402. Each stripe in this example is a portion of a particular bucket, where no two stripes in the same bucket overlap with each other. The division of each bucket in this example allows radix sorting to be performed by two independent processors operating in parallel in order to speed the radix sorting process. Illustrating only two stripes in this description is chosen to more simply and clearly describe and explain the relevant aspects of the described examples and associated processing. In general, the concepts described below are able to be easily expanded to dividing each bucket into any number of stripes in order to support parallel radix sort processing by a corresponding number of processors. In one example, all buckets are divided into an equal number of stripes, such as the illustrated two strips per bucket. In further examples, each bucket is able to be divided into four strips, 10 stripes, or any number of stripes.

In one example, as is described in further detail below, data consistency during parallel sorting processing is facilitated by assigning one stripe from bucket to one processor so that the one processor is able to perform a radix sort of data contained in the strips assigned to it without causing a data storage conflict with another processor that would be accessing the same data item. Conversely, each stripe is only assigned to one processor in this example. In this configuration, the processor is able to perform a radix sort on the data in the stripes assigned to it by freely placing each encountered data item into the stripe in the proper bucket for that data item without concern of a data storage conflict with a processor accessing the same data. Such independent data access improves processing efficiency and execution performance.

In the illustrated divided data set for parallel radix sorting 400, each stripe is initially defined by its own head pointer and tail pointer. In one example, the data items in one stripe of each bucket are assigned to one processor and that combined set is processed in a manner similar to the process described above with regards to the example in-place radix sort process 200.

The first bucket 410 is divided into a first bucket first stripe 450 and a first bucket second stripe 451. The first bucket first stripe 450 is initially defined by a first bucket first stripe head pointer $ph_1^1$ and a first bucket first stripe tail pointer $pt_1^1$. The first bucket second stripe 451 is initially defined by a first bucket second stripe head pointer $ph_1^2$ and a first bucket second stripe tail pointer $pt_1^2$.

The second bucket 412 is divided into a second bucket first stripe 452 and a second bucket second stripe 453. The second bucket first stripe 452 is initially defined by a second bucket first stripe head pointer $ph_2^1$ and a second bucket first stripe tail pointer $pt_2^1$. The second bucket second stripe 453 is initially defined by a second bucket second stripe head pointer $ph_2^2$ and a second bucket second stripe tail pointer $pt_2^2$.

The third bucket 414 is divided into a third bucket first stripe 454 and a third bucket second stripe 455. The third bucket first stripe 454 is initially defined by a third bucket first stripe head pointer $ph_1^1$ and a third bucket first stripe tail pointer $pt_1^1$. The third bucket second stripe 455 is initially defined by a third bucket second stripe head pointer $ph_1^2$ and a third bucket second stripe tail pointer $pt_1^2$.

The fourth bucket 416 is divided into a fourth bucket first stripe 456 and a fourth bucket second stripe 457. The fourth bucket first stripe 456 is initially defined by a fourth bucket first stripe head pointer $ph_1^1$ and a fourth bucket first stripe tail pointer $pt_1^1$. The fourth bucket second stripe 457 is initially defined by a fourth bucket second stripe head pointer $ph_1^2$ and a fourth bucket second stripe tail pointer $pt_1^2$.

In various examples, each stripe in a particular bucket is able to have various sizes relative to other stripes in the same bucket. In one example, each bucket is divided into stripes where each stripe in a bucket has the same size as other stripes in the same bucket. In further examples, stripes in a particular bucket are able to have different sizes, i.e., have unequal number of data items, relative to each other based upon various factors, such as information derived by various techniques to estimate the number of data items that will be placed into that stripe when the data set is sorted. For example, the sizes of different stripes in a bucket are able to be based on value distribution characteristics of the plurality of data items, such as a count of the number of items that will be placed into that stripe when the data is sorted.

FIG. 5 illustrates a first data stripe set 500, according to one example. The first stripe set 500 depicts a subset of the data items stored in the data structure 402 described above with regards to parallel radix sorting 400. In particular, the first data stipe set 500 depicts the first stripe that is defined for each bucket in the data structure 402. As illustrated, the first data stripe set 500 includes the first bucket first stripe 450, the second bucket first stripe 452, the third bucket first stripe 454, and the fourth bucket first stripe 456. In an example, a single processor is used to perform radix sorting on the data items contained in the stripes that make up the first data stripe set 500.

The processor performing radix sorting of the first stripe data set 500 generally proceeds by sequentially processing data in one stripe of one bucket, and proceeding to process the stripe in a next bucket after the stipe of one bucket is fully processed. In performing this processing, the processor generally maintains a processor head pointer 506. When starting to perform a radix sort on the data within a stripe, the processor head pointer is assigned to the same value, i.e., to point to the same storage location, as the head pointer for that stripe. For example, when processing the first bucket first stripe 450, the processor head pointer 506 is assigned to the same value as the first bucket first stripe head pointer 502. The separate head pointer is used in some examples to accommodate a possible condition encountered in the parallelized radix sort processing described herein. The handling of such conditions and accommodations are described in further detail below.

The first stripe data set 500 depicts the value of the stripe pointers after some of the radix sort processing of the data items contained in the first bucket first stripe 450 has been performed but is not completed. As is understood, radix sorting of a first bucket results in some data items being moved into their proper locations in other buckets based upon the value of the key in those data items. The first bucket first stripe head pointer $ph_1^{\ 1}$ 502 is depicted as pointing to the middle of the first bucket first stripe 450 and the first bucket first stripe tail pointer $pt_1^{\ 1}$ 504 points to the last data item in the first bucket first stripe 450. The processor head pointer 506 is further set to point to the same location as the first bucket first stripe head pointer $ph_1^{\ 1}$ 502. In this configuration, the data items preceding the first bucket first stripe tail pointer $pt_1^{\ 1}$ have been processed by the radix sorting algorithm and are thus properly sorted and located in the proper bucket. The data items located between the first bucket first stripe head pointer $ph_1^{\ 1}$ and the first bucket first stripe tail pointer $pt_1^{\ 1}$ are yet to be processed and are not yet sorted.

The second bucket first stripe 452 and the third bucket first stripe 454 depict similar head and tail pointers that reflect some of the data items in these stripes, i.e., the data items preceding the respective head pointer, are already sorted. Data items in these stripes that are between these pointers are yet to be processed and are therefore not yet sorted.

In one example, a processor performs a radix sort by sequentially processes data items within the stripes comprising the first data stripe set. An example of a radix sort process is described above with regards to FIG. 2. When a data item is encountered that is not located in the proper bucket, i.e., the key value for that data item does not match the key value associated with that bucket, that data item is generally placed into the stripe within the first data stripe set 500 that is located in the bucket associated with the key value of that data item. In an example, a misplaced data item in a first bucket is swapped with a data item pointed to by the head pointer of the corresponding stripe of the proper bucket for the misplaced data item The illustrated fourth bucket fourth stripe 456 in this example is shown to have the fourth bucket first stripe head pointer $ph_1^{\ 1}$ equal to the fourth bucket first stripe tail pointer $pt_1^{\ 1}$. The equality of these pointers indicates that all of the data items in this stripe have been processed and are in their proper bucket. The equality of these pointers further indicates that additional data items are not able to be placed into this stripe as would be required, for example, when a data item with a key value corresponding to the fourth bucket is found while performing radix sort processing of data items in stripes of another bucket. An example of processing to handle such a condition is described below.

FIG. 6 illustrates a second data stripe set 600, according to an example. The second data stripe set 600 consists of a subset of the data items stored in the data structure 402 that are the second set of stripes in each bucket. In particular, the second data stipe set 600 depicts the second stripe that is defined for each bucket in the data structure 402. As illustrated, the second data stripe set 600 includes the first bucket second stripe 451, the second bucket second stripe 453, the third bucket second stripe 455, and the fourth bucket second stripe 457. In an example, a single processor that is different from the processor performing a radix sort of the first data stripe set 500 is used to perform radix sorting on the data items contained in the stripes that make up the second data stripe set 600. Dividing the data contained in each bucket of the data structure 402 into different sets of stripes that do not overlap each other, and processing each of those sets of stripes with a different processor allows parallel processing of radix sorting of data stored in the data structure 402 without incurring data access conflicts or contentions between the two processors.

The second data stripe set 600 also illustrates processing that addresses a condition that is able to be encountered during parallelized radix sorting processing. Although the buckets defined for the data structure 402 are properly sized based on the histogram described above, the stripes are defined based on speculation about the number of data items that would be placed in each stripe when the data items in the stripe set is sorted. Because the distribution of key values of the data items that are initially within each stripe of a stripe set is not known before hand it is possible that a stripe in a particular bucket will not be large enough to all of the data items from the other stripes that have keys associated with the bucket of that particular stripe. Processing performed by one example to accommodate the condition of a stripe being unable to accept additional data items during a radix sort of the stripe set is described below.

The first bucket second stripe 451 is shown to have a first failed data item 610. In this example, the first failed data item 610 has a key value of "4" and therefore should be placed into the fourth bucket 416. In this example, when the radix sort processing of data items in the first bucket second stripe 451 encounters the first failed data item 610, the fourth bucket second stripe 457 is already full of data items having the key associated with the fourth bucket and therefore cannot accept the first failed data item 610. The fourth bucket second stripe 457 is determined to be unable to accept further data items by noting that the fourth bucket second stripe head pointer $pt_4^2$ is equal to the tail pointer $ph_4^2$.

In order to accommodate this condition, the radix sort processing of some examples maintains a process head pointer 606 that points to the data item currently being processed by the radix sort processing, i.e., the radix sort processing examines the value of the key in the data item pointed to by the process head pointer 606. Initially, when the radix sort processing begins processing a stripe, the process head pointer 606 is set equal to head pointer of that stripe. For example, when the radix sort processing begins processing the first bucket second stripe 451, the process head pointer 606 is set to be equal to the first bucket second stripe head pointer 602, which at the beginning of that stripe at that time. As data items are processed, the process head pointer 606 and the first bucket second stripe head pointer 602 advance together as data items are placed into their proper stripes so that they are located in their proper bucket and will be properly sorted according to the value of the key in each data item. If a stripe that is to receive a data item encountered by the radix sort processing becomes full and thus unable to receive that data item, the radix sort processing in one example leaves that data item, such as the first failed data item 610, in its original location and the process head pointer 606 is incremented so as to process the next data item. In this situation, the first bucket second stripe head pointer 602 is not incremented and continues to point to the first failed data item 610. This is the condition depicted by the second data stripe set 600, where the first bucket second stripe head pointer 602 is left pointing to the first failed data item 610, but the process head pointer 606 is advanced to the next data item in the first bucket second stripe 451. By leaving the first bucket second stripe head pointer 602 pointing to the first failed data item 610, the first bucket second stripe head pointer 602 will continue to point to a data item that has to be processed according to the radix sort processing, and the condition is satisfied that data items preceding the first bucket second stripe head pointer 602 are in the proper bucket according to the sort. In a parallelized radix sort in one example, as a new data item is encountered at the process head pointer 606 that has the proper key for the bucket being processed, either by being initially located there or swapped into that location according to a radix sort process, that new data item is swapped with the first failed data item 610 and both the process head pointer 606 and the first bucket second stripe head pointer 602 are incremented.

Figure 7:
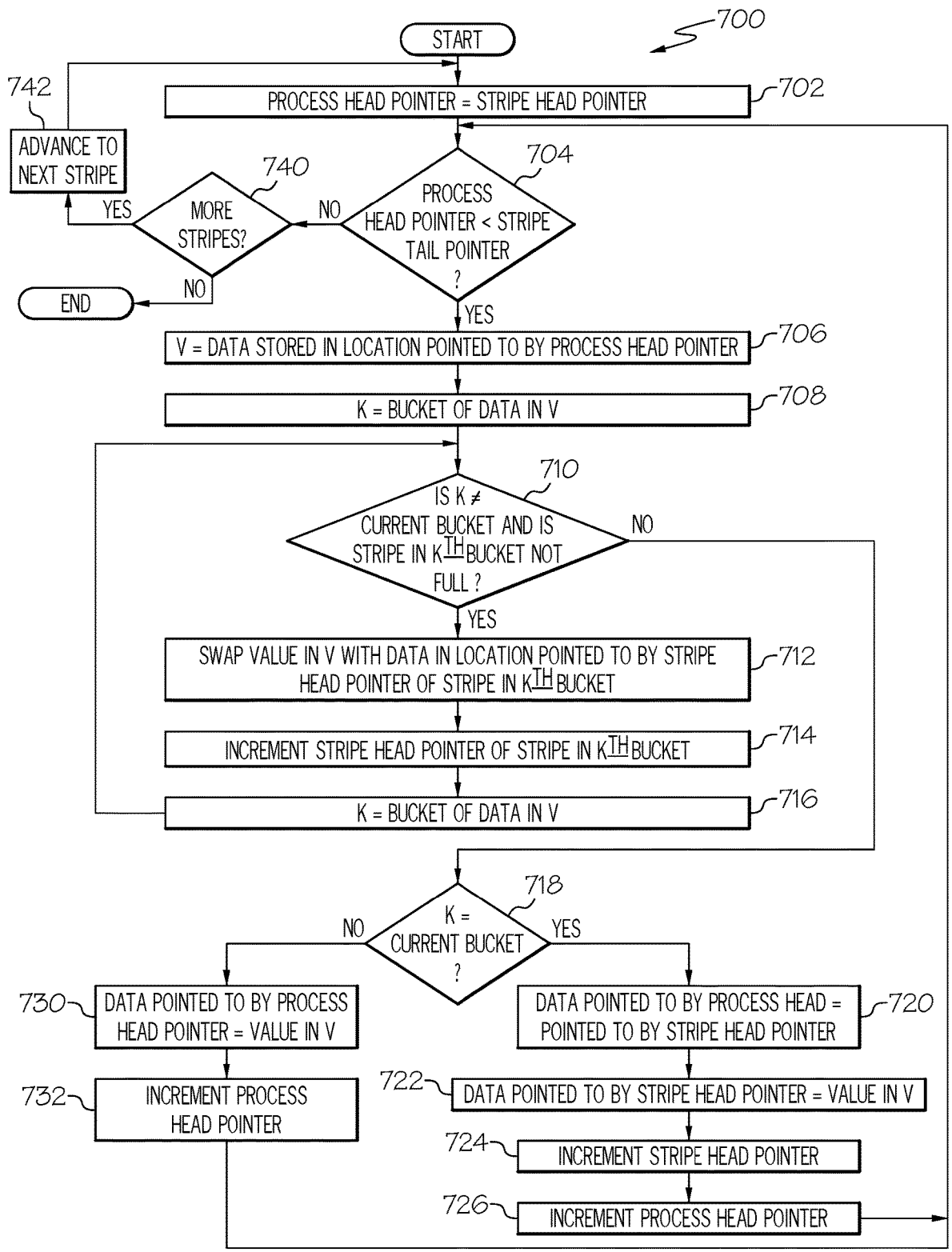
FIG. 7 illustrates an in-place partial bucket radix sort process, according to an example.

FIG. 7 illustrates an in-place partial bucket radix sort process 700, according to an example. The in-place partial bucket radix sort process 700 is an example of a process that performs permuting of data items within one stripe of a data stripe set in order to sort the data items according to a key value in the data item. As discussed above, a data stripe set is part of a data set to be sorted according to a radix sort, where the data stripe set includes one stripe, which is part of each bucket, from each bucket. The in-place partial bucket radix sort process 700 is an example of a process to perform radix sort processing on a stripe defined within buckets of a data set as is described above. The in-place partial bucket radix sort process 700 is an example of a process that operates on one stripe within the second data stripe set 600, as is described above, to move data items into the stripes within the second data stripe set 600 that are in the proper bucket based on the value of the key being sorted. The in-place partial bucket radix sort process 700 operates on a stripe within a data set, such as the data structure 402 that is depicted and described in FIGS. 4 and 6, that has buckets defined for each value of the key upon which data items are being sorted, and each bucket is further divided into stripes that have pointers defining the head and tail of each stripe. After the illustrated partial bucket radix sort stripe process is complete, the next stripe in the data stripe set, such as in the second data stripe set 600, is processed until all stripes in the stripe data set have been processed.

The in-place partial bucket radix sort process 700 allows a single processor to perform a radix sort on part of a data set that is to be sorted. Multiple processors are able to be assigned to different portions of the data to allow scalability by efficient parallelization of the sort processing. The partial bucket radix sort process incorporates various features to accommodate the speculative permutation whereby each bucket is speculatively divided into stripes to allow parallel processing of the separate stripes in each bucket. These various features include: 1) determining that the target stripe, i.e., the stripe in a bucket into which a data item being sorted is to be placed, is full in order not to overwrite existing elements in that target stripe; 2) head pointer of each stripe is only incremented if the data element being examined is in the correct bucket, thus ensuring that all data elements to the right of the head pointer are located in the proper bucket; and 3) all data items that are not located in the correct bucket, either because they have not yet been processed or because the stripe in the proper destination bucket for those items was full, are between the head and tail pointer for that stripe.

The in-place partial bucket radix sort process 700 begins by setting, at 702, a process head pointer to the value of the stripe head pointer for the stripe being processed. In one example, a separate process head pointer is maintained to accommodate certain aspects of partial bucket radix sorting, as is described above. In general, the process head pointer is the primary pointer used by the radix sorting process to identify the data item's key value and swap with data located in the bucket associated with the key value of that data item. An example of a process head pointer is described above as the process head pointer 606 with regards to the second data stripe set 600. In the following discussion, the pointers defining the start of each stripe are referred to as stripe pointers. In particular each stripe is said to have a stripe head pointer, referred to by the nomenclature $ph_x^y$, and a stripe tail pointer, referred to by the nomenclature $pt_x^y$. In this nomenclature, "x" refers to the bucket number, i.e., the value of the key associated with that bucket, and "y" refers to the stripe number for that bucket.

After setting the process head pointer to the value of the stripe head pointer, a determination is made, at 704, if the process head pointer is less than the stripe tail pointer. This condition determines if the process head pointer has reached the end of the stripe being currently processed. If this condition is true, the processing of the current stripe is complete and the processing moves to the next stripe in the data stripe set if there are any. As shown, a determination is made, at 740, if there are more stripes to process. If there are, the process advances, at 742, to the next stripe in the data stripe set, such as the illustrated second data stripe set, and returns to setting the process head pointer to the stripe head pointer, at 702, as is described above.

Returning to the decision at 704, if the process head pointer is determined to be less than the stripe tail pointer, a variable "V" is set, at 706, to equal the value of the data item stored in the location pointed to by the process head pointer. A variable "K" is set, at 708, to equal the key value of the data item in the variable "V," which is also the bucket into which that data item is to be placed in order to properly sort the data set being processed.

A determination is made, at 710, if the value of K is not equal to the value associated with the current bucket, and also if the stripe in the bucket associated with the value of K is full. The first part of this determination determines if K is not equal to the value associated with the currently processed bucket, thereby indicating that the data item pointed to by the process head pointer is to be moved into another bucket. The second part of this determination determines if there is room in the destination stripe for that data item, which is the stripe of the particular data stripe set that is in the $K^{th}$ bucket. In one example, the determination that the stripe in the $K^{th}$ bucket is not full is made by determining that the stripe head pointer for the stripe in the $K^{th}$ bucket is not equal to the stripe tail pointer for that same stripe.

If the determination is true, then the data item is pointed to by the process head pointer is to be swapped with the first unprocessed data item within the stripe in the $K^{th}$ bucket. The first unprocessed data item in that stripe is pointed to by the stripe head pointer for that stripe. The process performs this swap, at 712, by swapping the value in V with data in the location pointed to by the stripe head pointer of the stripe in the $K^{th}$ bucket. The stripe head pointer of the stripe in the $K^{th}$ bucket is incremented, at 714. The value stored in the variable K is then set, at 716, to the value of the bucket associated with, i.e., the value of the key of, the data stored the variable V. The process then continues to process the data items by returning to the decision, at 710, that is described above.

Returning to the decision at 710, if that decision is false, the process determines, at 718, if the value in the variable K corresponds to the bucket being currently processed. If the value in the variable K is determined to not correspond to the current bucket, then the stripe in the destination bucket is full as is determined above, at 710. In one example, the processing continues to process the data items in the stripe. In the illustrated example, the data pointed to by the process head pointer is set, at 730, to the value in the variable V, and the process head pointer is incremented, at 732. The process then returns to processing the next data item, by determining if the stripe is empty, at 704, and continuing with the processing described above.

Returning to the decision at 718, if the value of K indicates the current bucket, the current data item is in the proper bucket and already sorted. In the illustrated example, the process continues by swapping the values in the data storage that are pointed to by the process head pointer and the stripe head pointer. This corresponds to placing a value that is determined to be properly located in the current bucket into the location pointed to by the stripe head pointer. This swapping also places the value pointed to by the process head pointer at the location of the data item that had just been processed. Under some conditions, the data item pointed to by the stripe head pointer is a data item that belongs in another bucket but that was unable to be placed into that bucket because the stripe in that bucket was full. This swapping causes the misplaced data item to be moved down the stripe, and will result in all misplaced data items, i.e., data items that could not have been moved to the proper bucket, being located between the stripe head pointer and the stripe tail pointer. If all encountered data items are able to be placed into the proper destination buckets, then the stripe head pointer and the stripe tail pointer will be equal to each other at the end of processing this stripe. Placing these misplaced data items at the end of the stripe reduces the amount of some subsequent processing used to accommodate this characteristic of the in-place partial bucket radix sort process 700.

This swapping of data is performed, if the value in K is determined to be associated with the current bucket as determined at 718, by first setting, at 720, data storage pointed to by the process head pointer to the data pointed to by the stripe head pointer. This swapping is then completed by setting, at 722, data storage that is pointed to by the stripe head pointer to the value in the variable V. The stripe head pointer is incremented, at 724, and the process head pointer is incremented, at 726. The process then returns to processing the next item in the stripe, by determining if the process head pointer is at the end of the stripe, at 704, and continuing with the subsequent processing described above.

Figure 8:
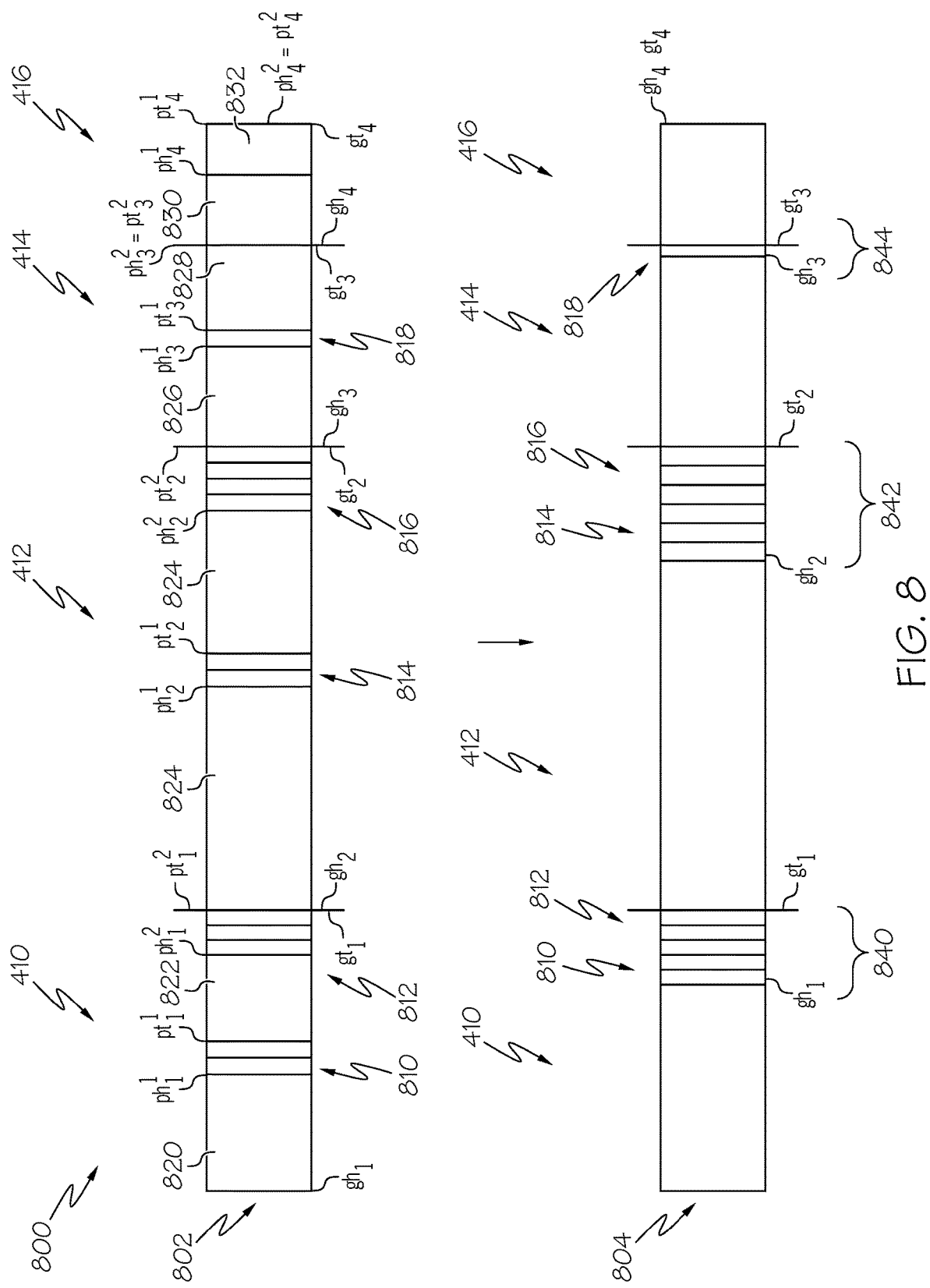
FIG. 8 illustrates a bucket repair permutation, according to an example.

FIG. 8 illustrates a bucket repair permutation 800, according to an example. As is described above, the in-place partial bucket radix sort process 700 is able to complete in a manner that leaves unsorted data items at the end of each stripe. In order to accommodate this condition, an example performs processing to group together all of the unsorted data items in each bucket so that these data items can be more efficiently processed. The bucket repair permutation 800 is an example of an efficient process to group the unsorted data items at one location in each bucket, so that these groups can be sorted into the correct buckets in order to complete sorting the data set according to the current key. In an example, the bucket repair permutation 800 is able to be performed independently on each bucket, thereby allowing multiple processors to operate in parallel with one processor operating on each bucket. Further, the bucket repair permutation 800 does not operate on all elements in the bucket, but only those elements between the stripe head pointer and the stripe tail pointer after each stripe is processed by the in-place partial bucket radix sort process 700.

The bucket repair permutation 800 illustrates a partially sorted data set 802, which corresponds to the data structure 402 after the in-place partial bucket radix sort process 700 has been performed on all of the defined stripes. The partially sorted data set 802 indicates the four buckets described above, the first bucket 410, the second bucket 412, the third bucket 414, and the fourth bucket 416, along with the two stripes that are defined for each bucket. Each bucket is defined by two pointers, such as the first global head pointer $gh_1$ 420 and the first global tail pointer $gt_1$ 421, the second global head pointer $gh_2$ 422 and the second global tail pointer $gt_2$ 423, the third global head pointer $gh_3$ 425 and the third global tail pointer $gt_3$ 426, and the fourth global head pointer $gh_4$ 428 and the second global tail pointer $gt_4$ 430, respectively, as is described above with regards to the divided data set for parallel radix sorting 400. These pointers are shown for the partially sorted data set 802. As is discussed above, four buckets with two stripes per bucket is illustrated in order to simplify the presentation of the relevant concepts and in further examples, any number of buckets that each contain any number of stripes is able to be defined for a data set being sorted.

The partially sorted data set 802 depicts five (5) regions that contain unsorted data items. In the illustrated partially sorted data set 802, the third bucket second stripe 828, the fourth bucket first stripe 830, and the fourth bucket second stripe 832 do not have unsorted data items. In an example, some of the stripes that do not contain unsorted data items were "filled" during the in-place partial bucket radix sort process 700 and have only data items that belong in that bucket based on the key value of those data items. Because some of these stripes were filled during the in-place partial bucket radix sort process 700, there are unsorted data items left in the stripes of other buckets because those data items were not able to be moved into the stipe in the correct bucket for those data items.

The partially sorted data set 802 illustrates a first unsorted data item group 810 that is the end of the first bucket first stripe 820, a second unsorted data item group 812 that is the end of the first bucket second stripe 822, a third unsorted data item group 814 that is the end of the second bucket first stripe 824, a fourth unsorted data item group 816 that is the end of the second bucket second stripe 826, and a fifth unsorted data item group 818 that is the end of the third bucket first stripe 828.

In one example, a bucket repair process is performed on the partially sorted data set to group together all of the unsorted data items in each bucket. The bucket repair permutation 800 depicts a repaired data set 804, which illustrates a first bucket unsorted data group 840 that contains the data items of the first unsorted data item group 810 and the second unsorted data item group 812. A second bucket unsorted data group 842 contains the third unsorted data item group 814 and the fourth unsorted data item group 816, and a third bucket unsorted data group 844 contains the fifth unsorted data item group 818.

In order to support iterative execution of the in-place partial bucket radix sort process 700 upon the unsorted data groups, the pointers defining the head and tail of each bucket are adjusted to point to the first and last data item of the unsorted data group in each bucket. As depicted in the repaired data set 804, the first global head pointer $gh_1$ and the first global tail pointer $gt_1$ 421 have been adjusted to point to the first data item in the first bucket unsorted data group 840, the second global head pointer $gh_2$ and the second global tail pointer $gt_2$ have been adjusted to point to the first data item in the second bucket unsorted data group 842, and the third global head pointer $gh_3$ and the third global tail pointer $gt_3$ have been adjusted to point to the first data item in the third bucket unsorted data group 844. The fourth bucket 416 in this example has no unsorted data items, and therefore the global head pointer $gh_4$ points to the same location as the second global tail pointer $gt_4$ to indicate that the bucket is fully sorted and no further processing is required.

Figure 9:
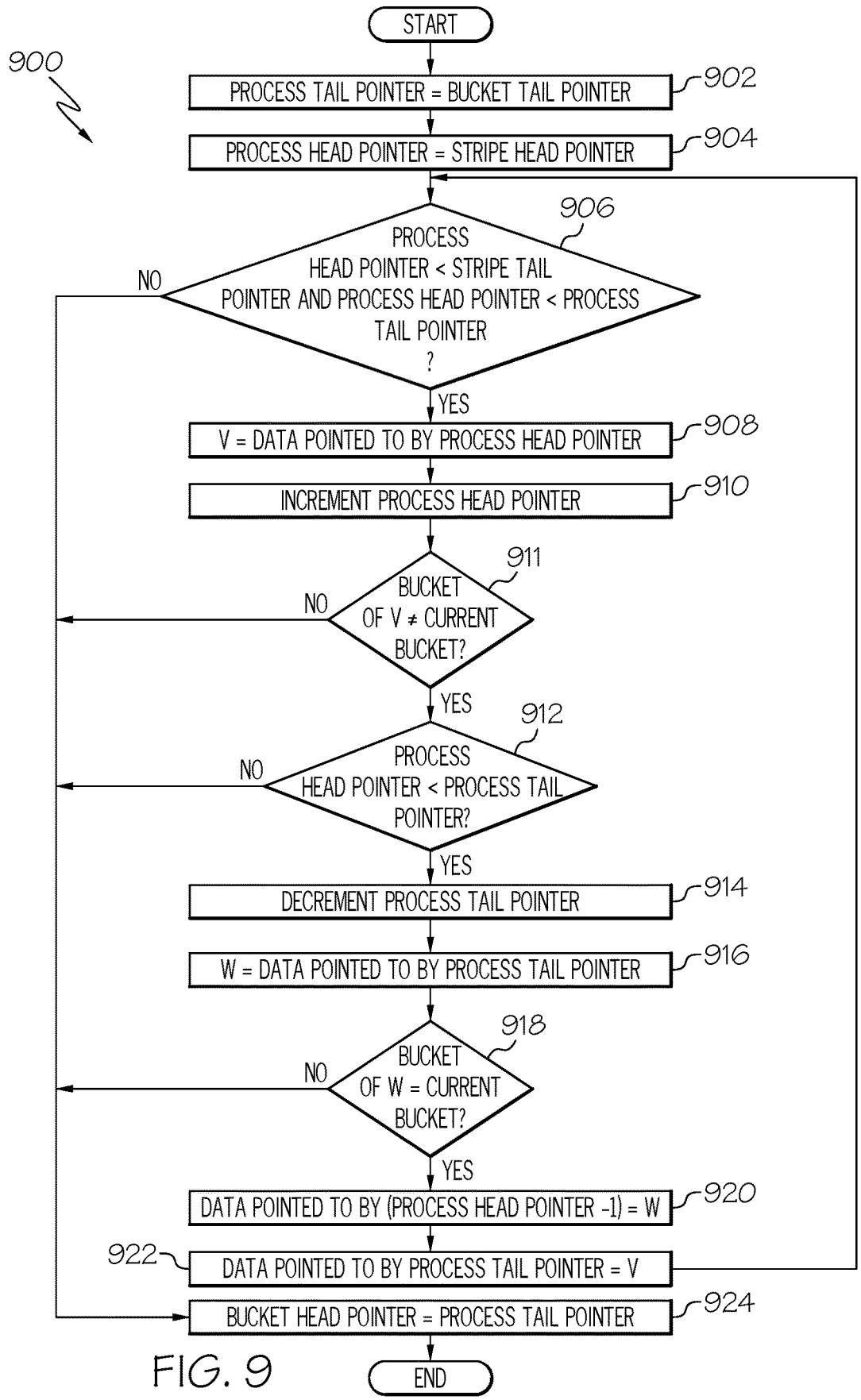
FIG. 9 illustrates a bucket repair process, according to an example.

FIG. 9 illustrates a bucket repair process 900, according to an example. The illustrated bucket repair process 900 is an example of process to group unsorted data items within each bucket, such as is described above with regards to the bucket repair permutation 800. Once the unsorted data items are grouped together in each bucket, these data items are able to be more efficiently sorted and placed in the correct bucket to complete sorting of the data set.

In an example, the bucket repair process 900 is performed independently on each bucket. The independence of the processing of each bucket allows the bucket repair process 900 to be performed on each of two or more buckets by different processors operating in parallel. Such parallelization of the bucket repair process by the independent processing of each bucket allows efficient utilization of parallel processing to increase the performance of this stage of data item sorting.

The bucket repair process 900 begins by setting, at 902, a process tail pointer to the value of the bucket tail pointer. In an example, the bucket repair process maintains a separate process tail pointer to point to the last item in the bucket being processed. A process head pointer is then set, at 904, to the value of the stripe head pointer of the stripe being processed. As discussed above, after performing the in-place partial bucket radix sort process 700, the stripe head pointer of each stripe points to the start of the unsorted data item group in that stripe. In an example, the bucket repair process maintains a separate process head pointer to point to the first item in the bucket being processed.

The process determines, at 906, if the process head pointer is less than the stripe tail pointer and if the process head pointer is less than the process tail pointer. This determination indicates that the bucket repair process is not completed for that bucket when these conditions are true. If this determination is not true, the processing of this bucket ends by setting, at 924, the bucket head pointer to the process tail pointer. When these conditions are true, a variable is set, at 908, to the value of the data item pointed to by the process head pointer and the process head pointer is incremented, at 910. A determination is then made, at 911, if the proper bucket for the data item in the variable "V" is not the current bucket being processed. If this determination is not true, the processing of this bucket ends by setting, at 924, the bucket head pointer to the process tail pointer.

Returning to the decision at 911, if the determination is true, a determination is made if the process head pointer is less than the process tail pointer, at 912. If this determination is not true, the processing of this bucket ends by setting, at 924, the bucket head pointer to the process tail pointer. If this determination is true, the process tail pointer is decremented, at 914 and a variable W is set equal to data pointed to by the process tail pointer, at 916. A determination is made if the proper bucket for the data stored in the variable W is the current bucket. If this determination is not true, the processing of this bucket ends by setting, at 924, the bucket head pointer to the process tail pointer. If this determination is true, the value in the variable W is stored in a location preceding the location in the data structure pointed to by the process head pointer, i.e., the location at the process head pointer—1, at 920. The data stored in the variable V is then stored in the location pointed to by the process tail pointer, at 922. The process then returns to determine, at 906, if the process head pointer is less than the stripe tail pointer and the process head pointer is less than the process tail pointer, as is described above.

Figure 10:
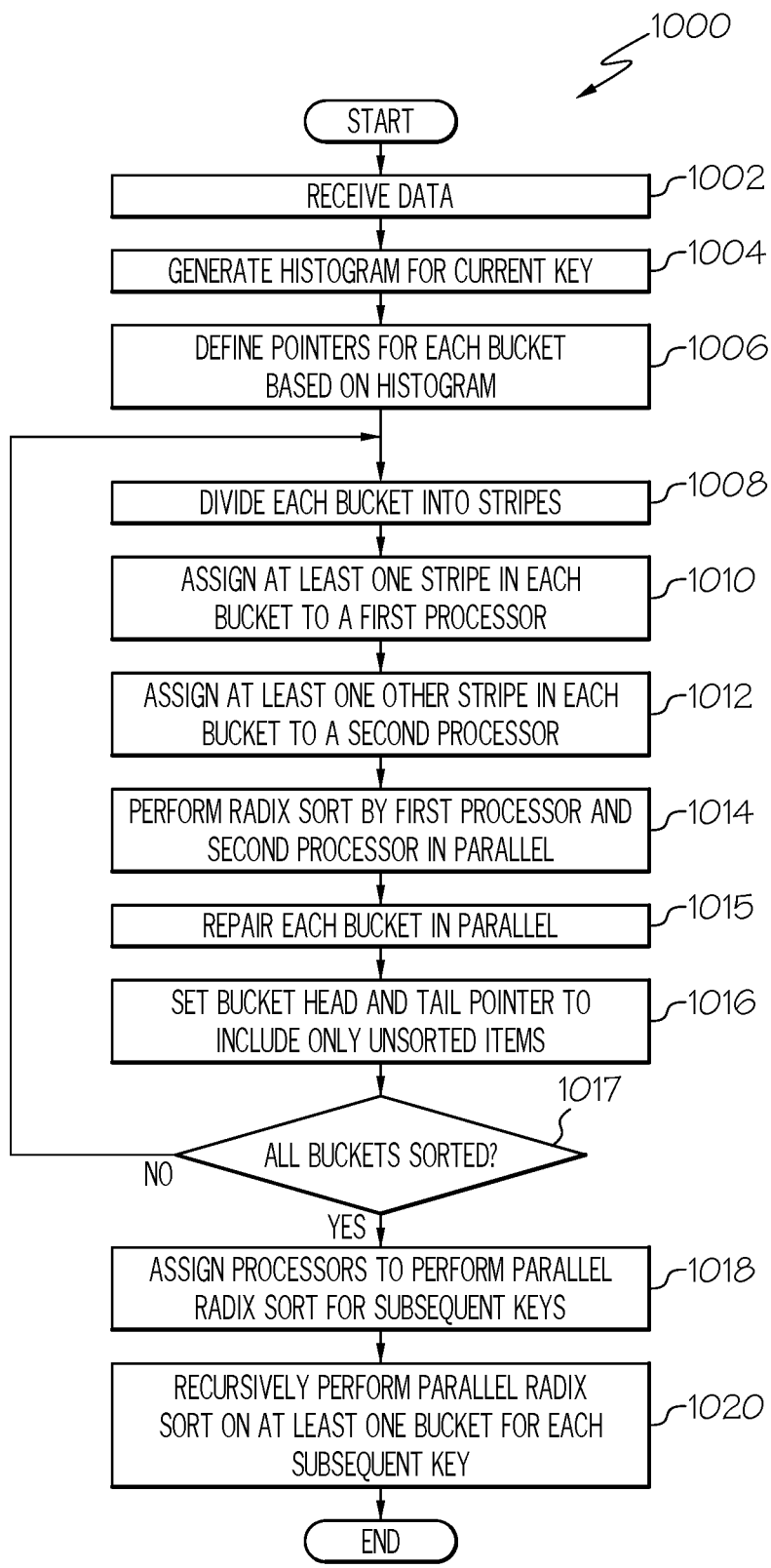
FIG. 10 illustrates a parallel radix sort process, according to an example.

FIG. 10 illustrates a parallel radix sort process 1000, according to an example. The parallel radix sort process 1000 depicts an example of a complete data set sorting process that includes the in-place partial bucket radix sort process 700 and the bucket repair process 900, described above.

The parallel radix sort process 1000 begins by receiving, at 1002, a data set. The data set is able to be received in any suitable manner In various examples, the received data set is able to be completely stored in a random access memory accessible to a processor, or parts of the data set is able to be stored in an external data storage whose contents is selectively brought into the local processing memory of the processor for processing.

A histogram is generated, at 1004. As discussed above with regards to the example histogram generation 300, a histogram in this context is a count of the number of data items that have each key value. In general, multiple processors are able to execute the processing in parallel to generate this histogram. For example, the received data set is able to be divided into a number of portions equal to the number of processors, and each processor is assigned one portion where the processor counts the number of each key value occurring in the portion assigned to it. After each processor determines the histogram data for its portion of the received data, these histogram values are added to determine a composite histogram for the entire received data set.

Pointers to indicate the start and end of each bucket, based on the histogram data, are define, at 1006. As described above, for each key on which the data items in the received data set is to be sorted, pointers are able to be defined that indicate where changes in the key values in the sorted data items will occur.

Each bucket is then divided, at 1008, into stripes, which are non-overlapping portions of each particular bucket. At least on stripe in each bucket is then assigned, at 1010, to a first processor.

At least one other stripe in each bucket is then assigned, at 1012, to a second processor. Dividing buckets into multiple stripes and assigning at least one stripe in each bucket to a separate processor is discussed above with regards to the divided data set for parallel radix sorting 400. Once these non-overlapping stripes are assigned to different processors, each processor is able to performing an in-place partial bucket radix sort process 700 on the stripes assigned to it, as is described above with regards to the first data stripe set 500 and the second data stripe set 600. In the illustrated parallel radix sort process 1000, the first processor and the second processor each perform a partial bucket radix sort, at 1014, on the stripes assigned to them.

After each processor performs a parallel radix sort process on the stripes assigned to it, a bucket repair process is performed, at 1015. The bucket repair process in this example groups together all of the unsorted data items in each bucket so that subsequent processing is able to properly place these data items into the proper bucket to complete sorting on the current key. In an example, the above described bucket repair process 900 is performed.

After performing a bucket repair process, there may be unsorted data items at the end of each bucket. The bucket head pointer and the bucket tail pointer are set, at 1016, to include only the unsorted data items, which were grouped by the bucket repair process. A determination is made, at 1017, to determine if all data buckets have been sorted. As described above, once the bucket repair process is finished some buckets are able to have unsorted items remaining, but those unsorted items will be grouped together, such as at the end of the bucket. If it is determined that the buckets are not all sorted, such as is able to be determined by determining if any bucket head pointer is not equal to the bucket tail pointer for that bucket, the process sorts those unsorted data items. In one example, the process performs an in-place partial bucket radix sort process 700 on the remaining unsorted data items. In the illustrated example, the process returns to dividing, at 1008, each bucket, as defined by the bucket head pointer and the bucket tail pointer for that bucket, into stripes. This is not the full bucket, but only those data items in each bucket that is unsorted.

After repair of the buckets and determining that all buckets are completely sorted, the data set is properly sorted according to the current key. In order to completely sort the received data set, each bucket for the currently sorted key is recursively sorted according to the next key value. This recursive sorting continues until the received data set is completely sorted according to all of the applicable keys, such as digits in a number. In the example parallel radix sort process 1000, processors are assigned, at 1018, to perform parallel radix sort processes for subsequent keys. In some examples, after the data is sorted into buckets according to a first key, only a subset of those buckets are selected for sorting according to a subsequent key by a parallel radix sort process. Other buckets are sorted according to, for example, another in-place radix sorting algorithm. The parallel radix sort processes are then recursively performed, at 1020, for each subsequent key. The parallel radix sort process 1000 then ends.

Figure 11:
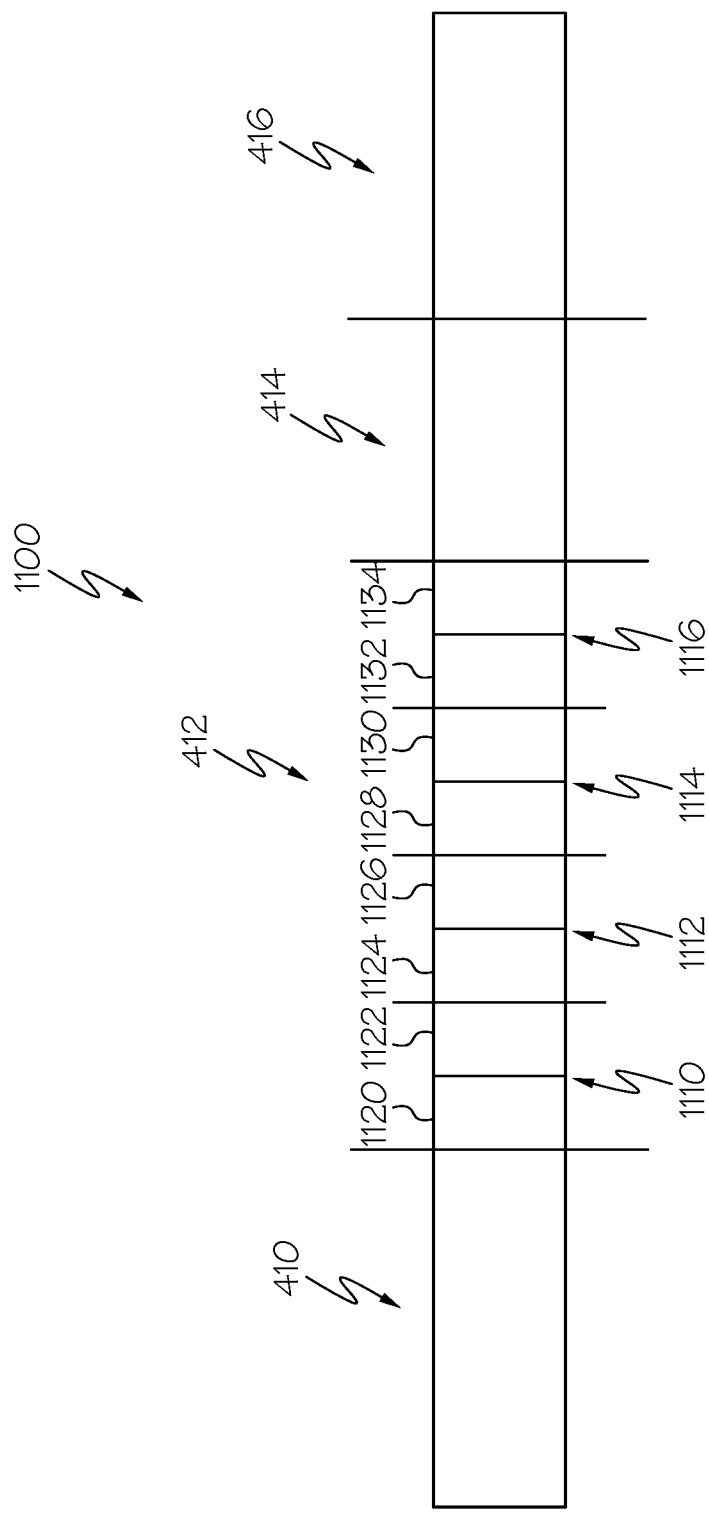
FIG. 11 illustrates a second key radix sort, according to an example.

FIG. 11 illustrates a second key radix sort 1100, according to an example. The second key radix sort 1100 depicts a data set 1102 after completing an in-place radix sort according to a first key. The second key radix sort 1100 illustrates the data buckets defined for the first key radix sort, such as is described above with regards to FIGS. 3 and 4. In the context of the second key radix sort 1100, the four buckets defined for the first level key, i.e., the first bucket 410, the second bucket 412, the third bucket 414, and the fourth bucket 416, have been sorted according to the first sort key, such as the most significant digit of numbers in the data set, but the contents of these buckets are not sorted with regards to a next level key, such as the next most significant digit of those numbers. As part of the sorting process, the sorting process recursively sorts the contents of each bucket according to subsequent keys, until the data has been sored according to all keys.

In order to more clearly describe relevant aspects depicted by this figure, the second bucket 412 is much larger than the other buckets. This reflects that there are more data items that have a key value associated with the second bucket 412 than with other buckets. In this example, it is further assumed that the next level key is also able to have four values, and therefore the sorting of data within each bucket is also performed by an in-place radix sort that will place data items into one of four lower level buckets that are defined within each bucket of the higher order key.

In order to more efficiently sort the data items in the larger second bucket 412 in this example, the data items within the second bucket 412 are processed by multiple processors operating in parallel according to the above described in-place partial bucket radix sort process 700. The second bucket 412 is shown to be divided into four low level buckets, a first lower level bucket 1110, a second lower level bucket 1112, a third lower level bucket 1114, and a fourth lower level bucket 1116. Each of these lower level buckets is show to be further divided into two stripes. The first lower level bucket 1110 is divided into the first lower level bucket first stripe 1120 and the first lower level bucket second stripe 1122. The second lower level bucket 1112 is divided into the second lower level bucket first stripe 1124 and the second lower level bucket second stripe 1126. The third lower level bucket 1114 is divided into the third lower level bucket first stripe 1128 and the third lower level bucket second stripe 1130. The fourth lower level bucket 1116 is divided into the fourth lower level bucket first stripe 1132 and the fourth lower level bucket second stripe 1134. A parallel radix sort process, such as the in-place partial bucket radix sort process 700 described above, is executed on these four lower level buckets to sort the data therein based upon the second level key of the data. In one example, sorting the data in the other buckets according to the second level key, such as the data in first bucket 410, the third bucket 414, and the fourth bucket 416 is able to be performed by other techniques, such as more conventional in-place radix sorting. In further examples, the data in some or all of the other buckets is also able to be sorted according to a parallel radix sort process, such as the in-place partial bucket radix sort process 700. In one example, the selection of processing a lower level bucket is based upon the number of data items within the bucket and, for example, a judgment according to various defined rules that a parallel radix sort is to be applied instead of, for example, a conventional in-place radix sort or other sort algorithm.

Figure 12:
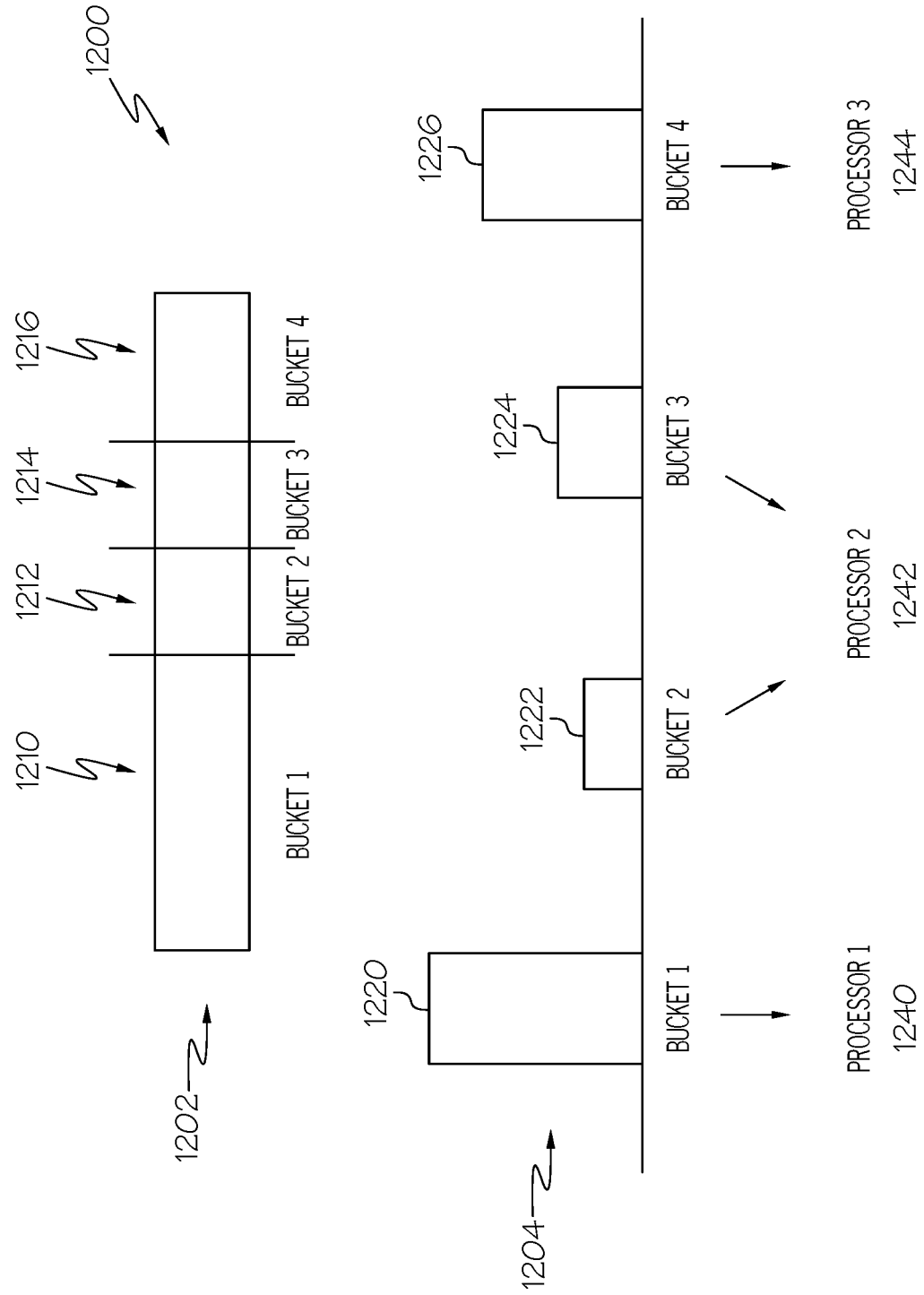
FIG. 12 illustrates a second level key radix sort processing distribution, according to an example.

FIG. 12 illustrates a second level key radix sort processing distribution 1200, according to an example. The second level key radix sort processing distribution 1200 depicts an example of performing radix sorting on a second key, or a subsequent key after the first key, of data items. Radix sorting on the first key of data items in a data set, such as by sorting according to the most significant digit of a number, requires accessing all data items in the data set in order to swap data items into the correct bucket. Once the data items are sorted according to the first key, the data in each bucket defined by the first key values are able to be sorted independently of data in other buckets defined by the first key. This independence is true for performing radix sorting according to all keys except the first key of the sort. In order to improve the performance of data sorting after the data set is sorted according to the first key, one example allocates one or more buckets to each available processor according to a number of items to sort in each bucket.

The second level key radix sort processing distribution 1200 depicts a data set 1202 that has four defined buckets, a first bucket 1210, a second bucket 1212, a third bucket 1214, and a fourth bucket 1216. A bucket data item count 1204 depicts a relative number of data items in each bucket, with a first bucket count 1220, a second bucket count 1222, a third bucket count 1224, and a fourth bucket count 1226. In this illustration, the first bucket count 1220 indicates that the first bucket 1210 has a much higher first bucket count 1220, and therefore has many more data items than the other buckets. The fourth bucket 1216 is shown to have a fourth bucket count 1228 that is a bit larger than the second bucket count 1222 and the third bucket count In order to more efficiently perform sorting of the data in the data set 1202 according to the second key by multiple processors, each processor is assigned one or more buckets to perform radix of data based on keys other than the first key after the second key based on the number of data items in each bucket. In the illustrated example, first bucket 1210 has a relatively large number of data items, so one processor, processor 1 1240 in this example, is assigned to perform a subsequent radix sort on the data with in first bucket 1210. The second bucket 1212 and the third bucket 1214 each have a relatively small number of data items, and the radix sort on the subsequent key in those buckets is anticipated to require fewer processing resources, e.g., will take less processing time, to perform. Therefore, one processor, i.e., processor 2 1242 in this example, is assigned to perform the radix sort on both the second bucket 1212 and third bucket 1214. Processor 2 1242 is able to process these two buckets either sequentially, e.g., processing the second bucket 1212 first followed by processing the third bucket 1214, or the processor is able to perform the tasks in parallel through known techniques. In the illustrated example, the fourth bucket 1226 is shown to have more data items than either the first bucket or the second bucket, so one processor, processor 3 1244 in this example, is assigned to perform the sort on the subsequent keys in that bucket.

The above assignment of processors to individual buckets is one design choice available for performing parallel processing of sorting on subsequent data keys, where individually processing each bucket is by a separate processor is a practical option given the independent nature of sorting the data in these buckets. In another example, buckets are not assigned to specific processors, but each processor beings by processing bucket that has not yet been processed, and after completing the sort based on the subsequent key in that bucket, moves to the next bucket that has not been processed. Each processor sequentially processes buckets in this example until all buckets are sorted.

In another example, sorting a bucket according to a subsequent key that has a that has a large number of data items is able to be performed by assigning multiple processors to that bucket, where each processor performs a parallel radix sort process 1000, as is described above. Designs of systems to allocate multiple processors to perform sorting on subsequent keys within buckets is able to base such decisions on, for example, heuristics regarding performance of parallel radix sort processes on data sets of various sizes relative to performing a conventional radix sort on the data, or any other criteria.

Information Processing System

Figure 13:
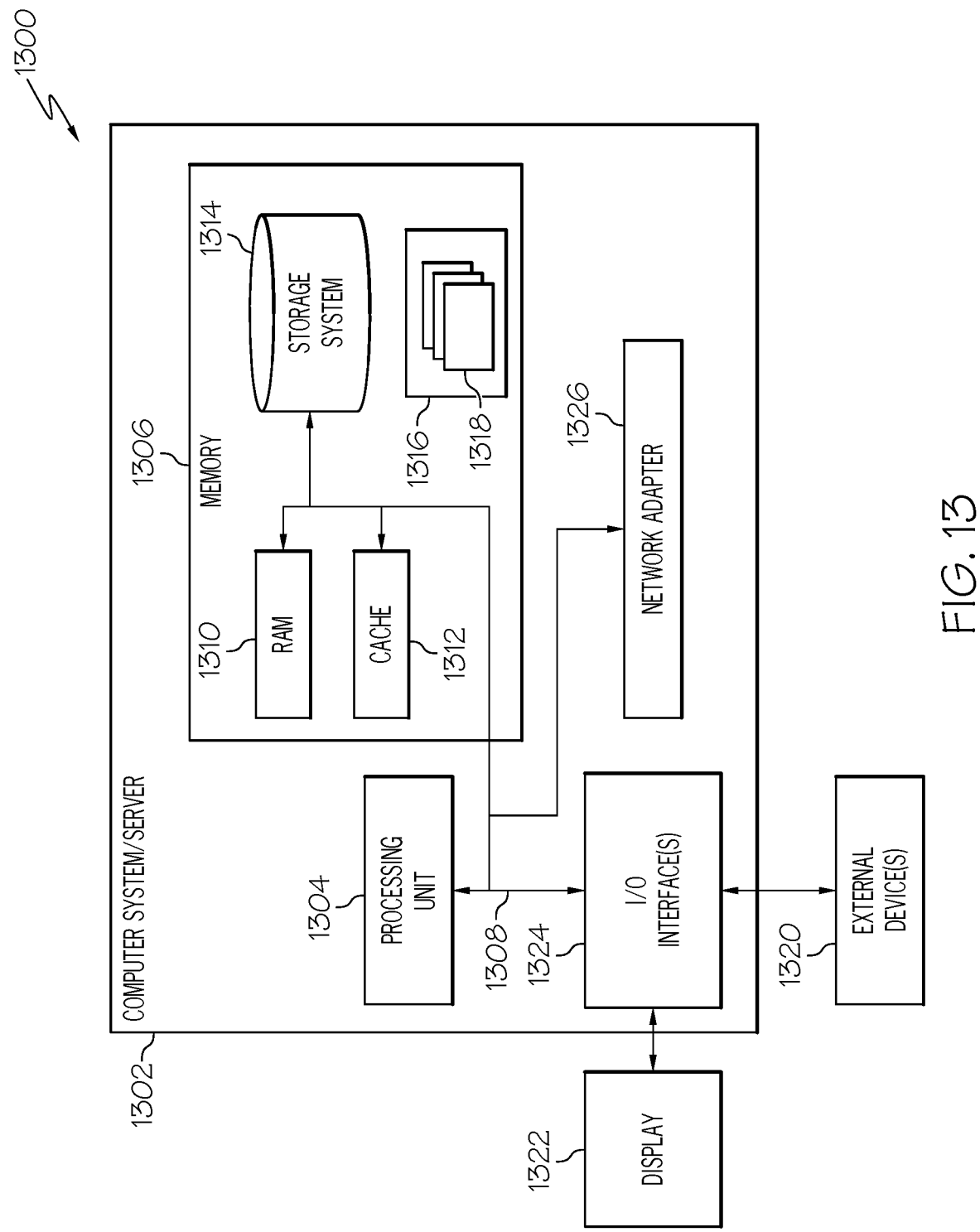
FIG. 13 is a block diagram illustrating one example of an information processing system according to one example.

Referring now to FIG. 13, this figure is a block diagram illustrating an information processing system that can be utilized in various examples of the present disclosure. The information processing system 1302 is based upon a suitably configured processing system configured to implement one or more embodiments of the present disclosure. Any suitably configured processing system can be used as the information processing system 1302 in embodiments of the present disclosure. In another embodiment, the information processing system 1302 is a special purpose information processing system configured to perform one or more embodiments discussed above. The components of the information processing system 1302 can include, but are not limited to, one or more processors or processing units 1304, a system memory 1306, and a bus 1308 that couples various system components including the system memory 1306 to the processor 1304.

The bus 1308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1306 can also include computer system readable media in the form of volatile memory, such as random access memory (RAM) 1310 and/or cache memory 1312. The information processing system 1302 can further include other removable/non-removable, volatile/non-volatile computer system storage media. By way of example only, a storage system 1314 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1308 by one or more data media interfaces. The memory 1306 can include at least one program product having a set of program modules that are configured to carry out the functions of various examples described above.

Program/utility 1316, having a set of program modules 1318, may be stored in memory 1306 by way of example, and not limitation, as well as an operating system, one or more application programs, other program modules, and program data. Each of the operating system, one or more application programs, other program modules, and program data or some combination thereof, may include an implementation of a networking environment. Program modules 1318 generally carry out the functions and/or methodologies of the above described processes and systems.

The information processing system 1302 can also communicate with one or more external devices 1320 such as a keyboard, a pointing device, a display 1322, and the like. The information processing system 1302 is further able to communicate with one or more devices that enable a user to interact with the information processing system 1302; and/or any devices (e.g., network card, modem, etc.) that enable computer system/server 1302 to communicate with one or more other computing devices. Such communication can occur via I/O interfaces 1324. Still yet, the information processing system 1302 can communicate with one or more networks such as a local area network (LAN), a general wide area network (WAN), and/or a public network (e.g., the Internet) via network adapter 1326. As depicted, the network adapter 1326 communicates with the other components of information processing system 1302 via the bus 1308. Other hardware and/or software components can also be used in conjunction with the information processing system 1302. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical and to enable others of ordinary skill in the art to understand the invention for various embodiments with various modifications as are suited to the particular use contemplated.

What is claimed is:

1. A method comprising:
    dividing a data storage into a plurality of buckets comprising at least a first bucket and a second bucket, each bucket being associated with a respective key value, the data storage containing a plurality of data items;
    identifying, within each bucket of the plurality of buckets, a respective plurality of stripes;
    defining a plurality of data stripe sets, each data stripe set in the plurality of data stripe sets comprising one respective stripe within each respective bucket of the plurality of buckets, the plurality of data stripe sets comprising at least a first data stripe set and a second data stripe set that is separate from the first data stripe set;
    performing a first in-place partial bucket radix sort using an initial radix value on data items contained within the first data stripe set within the plurality of data stripe sets;
    performing a second in-place partial bucket radix sort using the initial radix value on data items contained within the second data stripe set;
    grouping, after performing the first in-place partial bucket radix sort and the second in-place partial bucket radix sort, incorrectly sorted data items in each bucket into a respective incorrect data item group within each bucket, the incorrectly sorted data items comprising data items within the first bucket but having a respective radix value associated with a different bucket,
    the grouping comprising grouping incorrectly sorted data items in the first bucket with a first processor and grouping incorrectly sorted data items in the second bucket with a second processor that is different from the first processor while grouping incorrectly sorted data items in the first bucket with the first processor;
    performing a radix sort using the initial radix value on items within the respective incorrect data item group; and
    producing a first level sorted output comprising the plurality of data items within the data storage sorted according to the initial radix value.

2. The method of claim 1, wherein the second in-place partial bucket radix sort is performed with the second processor.

3. The method of claim 1,
    wherein the dividing comprises defining a plurality of data pointers into the data storage, each data pointer indicating a separation between two adjacent buckets, and
    wherein the defining the plurality of data stripe sets comprises:
        defining a respective stripe head pointer for each respective stripe, each respective stripe head pointer indicating a first element of each respective stripe; and
        defining a respective stripe tail pointer for each respective stripe, each respective stripe tail pointer indicating a last element of each respective stripe.

4. The method of claim 1, wherein each stripe in a particular data stripe set contains an equal number of data items.

5. The method of claim 1, wherein at least one stripe within a data stripe set contains a first number of data elements unequal to a second number of data elements within stripes of the data stripe set that are other than the at least one stripe.

6. The method of claim 5, wherein the first number of data elements and the second number of data elements are based upon value distribution characteristics of the plurality of data items.

7. The method of claim 1, further comprising:
    dividing, subsequent to performing the radix sort using the initial radix value on items within the respective incorrect data item group, at least one bucket within the plurality of buckets into a plurality of second level buckets, each second level bucket being associated with a respective second level key value;
    identifying, within at least one second level bucket, a plurality of respective second level stripes;
    defining at least one second level data stripe set comprising one respective second level stripe within each second level bucket of a respective at least one bucket; and
    performing, with the first processor, a partial bucket radix sort on the first level sorted output using a second level radix value on data items contained within the at least one second level data stripe set.

8. The method of claim 7, further comprising selecting the at least one second level bucket based upon a number of data elements in the at least one second level bucket relative to a number of data elements in other second level buckets within the plurality of buckets.

9. A data set sorting apparatus, comprising:
a multiple processor computing apparatus comprising a first processor and a second processor;
a memory coupled to the multiple processor computing apparatus;
a data sorting processor, coupled to the multiple processor computing apparatus and the memory, the data sorting processor configured to:
divide a data storage into a plurality of buckets comprising at least a first bucket and a second bucket, each bucket being associated with a respective key value, the data storage containing a plurality of data items;
identify, within each bucket of the plurality of buckets, a respective plurality of stripes;
define a plurality of data stripe sets, each data stripe set in the plurality of data stripe sets comprising one respective stripe within each respective bucket of the plurality of buckets, the plurality of data stripe sets comprising at least a first data stripe set and a second data stripe set that is separate from the first data stripe set;
perform a first in-place partial bucket radix sort using an initial radix value on data items contained within the first data stripe set;
perform a second in-place partial bucket radix sort using the initial radix value on data items contained within the second data stripe set;
group, after performing the first in-place partial bucket radix sort and the second in-place partial bucket radix sort, incorrectly sorted data items in each bucket into a respective incorrect data item group within each bucket, the incorrectly sorted data items comprising data items within the first bucket but having a respective radix value associated with a different bucket,
the data sorting processor is configured to group by at least grouping incorrectly sorted data items in the first bucket with a first processor and grouping incorrectly sorted data items in the second bucket with a second processor that is different from the first processor while grouping incorrectly sorted data items in the first bucket with the first processor;
perform a radix sort using the initial radix value on items within the respective incorrect data item group; and
produce a first level sorted output comprising the plurality of data items within the data storage sorted according to the initial radix value.

10. The apparatus of claim 9, wherein the second in-place partial bucket radix sort is performed with the second processor.

11. The apparatus of claim 9, wherein the data sorting processor is configured to:
divide the data storage by at least defining a plurality of data pointers into the data storage, each data pointer indicating a separation between two adjacent buckets, and
defining the plurality of data stripe sets by at least:
defining a respective stripe head pointer for each respective stripe, each respective stripe head pointer indicating a first element of each respective stripe; and defining a respective stripe tail pointer for each respective stripe, each respective stripe tail pointer indicating a last element of each respective stripe.

12. The apparatus of claim 9, wherein each stripe in a particular data stripe set contains an equal number of data items.

13. The apparatus of claim 9, wherein at least one stripe within a data stripe set contains a first number of data elements unequal to a second number of data elements within stripes of the data stripe set that are other than the at least one stripe.

14. The apparatus of claim 13, wherein the first number of data elements and the second number of data elements are based upon value distribution characteristics of the plurality of data items.

15. The apparatus of claim 9, wherein the data sorting processor is further configured to:
divide, subsequent to performing the radix sort using the initial radix value on items within the respective incorrect data item group, at least one bucket within the plurality of buckets into a plurality of second level buckets, each second level bucket being associated with a respective second level key value;
identify, within at least one second level bucket, a plurality of respective second level stripes;
define at least one second level data stripe set comprising one respective second level stripe within each second level bucket of a respective at least one bucket; and
perform, with the first processor, a partial bucket radix sort on the first level sorted output using a second level radix value on data items contained within the at least one second level data stripe set.

16. The apparatus of claim 15, further wherein the data sorting processor is further configured to select the at least one second level bucket based upon a number of data elements in the at least one second level bucket relative to a number of data elements in other second level buckets within the plurality of buckets.

17. A computer program product for sorting a data set, the computer program product comprising:
a storage medium readable by a processing circuit and storing instructions for execution by the processing circuit for performing a method comprising:
dividing a data storage into a plurality of buckets comprising at least a first bucket and a second bucket, each bucket being associated with a respective key value, the data storage containing a plurality of data items;
identifying, within each bucket of the plurality of buckets, a respective plurality of stripes;
defining a plurality of data stripe sets, each data stripe set in the plurality of data stripe sets comprising one respective stripe within each respective bucket of the plurality of buckets, the plurality of data stripe sets comprising at least a first data stripe set and a second data stripe set that is separate from the first data stripe set;
performing a first in-place partial bucket radix sort using an initial radix value on data items contained within one data stripe set;
performing a second in-place partial bucket radix sort using the initial radix value on data items contained within the second data stripe set;
grouping, after performing the first in-place partial bucket radix sort and the second in-place partial bucket radix sort, incorrectly sorted data items in each bucket into a respective incorrect data item group within each bucket, the incorrectly sorted data items comprising data items within the first bucket but having a respective radix value associated with a different bucket, the grouping comprising grouping incorrectly sorted data items in the first bucket with a first processor and grouping incorrectly sorted data items in the second bucket with a second processor that is different from the first processor while grouping incorrectly sorted data items in the first bucket with the first processor;

performing a radix sort using the initial radix value on items within the respective incorrect data item group; and producing a first level sorted output comprising the plurality of data items within the data storage sorted according to the initial radix value.

18. The computer program product of claim 17, wherein the dividing comprises defining a plurality of data pointers into the data storage, each data pointer indicating a separation between two adjacent buckets, and wherein the defining the plurality of data stripe sets comprises:

defining a respective stripe head pointer for each respective stripe, each respective stripe head pointer indicating a first element of each respective stripe; and defining a respective stripe tail pointer for each respective stripe, each respective stripe tail pointer indicating a last element of each respective stripe.

19. The computer program product of claim 17, wherein at least one stripe within a data stripe set contains a first number of data elements unequal to a second number of data elements within stripes of the data stripe set that are other than the at least one stripe.

20. The computer program product of claim 17, wherein the method further comprises:

dividing, subsequent to performing the radix sort using the initial radix value on items within the respective incorrect data item group, at least one bucket within the plurality of buckets into a plurality of second level buckets, each second level bucket being associated with a respective second level key value;

identifying, within at least one second level bucket, a plurality of respective second level stripes;

defining at least one second level data stripe set comprising one respective second level stripe within each second level bucket of a respective at least one bucket; and performing, with the first processor, a partial bucket radix sort on the first level sorted output using a second level radix value on data items contained within the at least one second level data stripe set.

* * * * *